US009825863B2

United States Patent
Palin et al.

(10) Patent No.: US 9,825,863 B2
(45) Date of Patent: Nov. 21, 2017

(54) BUFFER CONTROL FOR MULTI-TRANSPORT ARCHITECTURES

(75) Inventors: Arto Palin, Viiala (FI); Juha-Matti Tuupola, Tampere (FI); Timo Eriksson, Espoo (FI); Jukka Reunamäki, Tampere (FI)

(73) Assignee: Nokia Technologies Oy, Espoo (FI)

( * ) Notice: Subject to any disclaimer, the term of this patent is extended or adjusted under 35 U.S.C. 154(b) by 694 days.

(21) Appl. No.: 12/920,041

(22) PCT Filed: Feb. 27, 2008

(86) PCT No.: PCT/IB2008/050711
§ 371 (c)(1),
(2), (4) Date: Aug. 27, 2010

(87) PCT Pub. No.: WO2009/106932
PCT Pub. Date: Sep. 3, 2009

(65) Prior Publication Data
US 2011/0002344 A1  Jan. 6, 2011

(51) Int. Cl.
*H04L 12/54* (2013.01)
*H04W 28/10* (2009.01)
(Continued)

(52) U.S. Cl.
CPC ............ *H04L 47/10* (2013.01); *H04L 47/193* (2013.01); *H04L 47/30* (2013.01); *H04L 49/90* (2013.01);
(Continued)

(58) Field of Classification Search
None
See application file for complete search history.

(56) References Cited

U.S. PATENT DOCUMENTS

| 5,491,693 A | 2/1996 | Britton et al. |
| 5,548,723 A | 8/1996 | Pettus |
(Continued)

FOREIGN PATENT DOCUMENTS

| CN | 1633097 A | 6/2005 |
| CN | 1758604 | 4/2006 |
(Continued)

OTHER PUBLICATIONS

International Search Report and Written Opinion of the International Searching Authority for Patent Cooperation Treaty Application No. PCT/IB2008/050708 dated Mar. 3, 2009, 17 pages.
(Continued)

*Primary Examiner* — Alpus H Hsu
(74) *Attorney, Agent, or Firm* — Locke Lord LLP

(57) ABSTRACT

A system and method for automating connection management in a manner that may be transparent to any actively communicating applications operating in a Network on Terminal Architecture (NoTA). An application level entity may access another node by making a request to a high level communication structure via an interface. The high level structure may interact with a lower level structure configured to manage communication by establishing communication with another device via one or more transports. In at least one embodiment, provisions may be made to guard against data being lost when a transport fails, including storing data that is passed from a transport-independent buffer to a transport-specific buffer in case the transport fails. When a failure occurs, the stored data may readily be forwarded for sending using another transport.

15 Claims, 18 Drawing Sheets

(51) Int. Cl.

| | | |
|---|---|---|
| H04L 12/801 | (2013.01) | |
| H04L 12/835 | (2013.01) | |
| H04L 12/861 | (2013.01) | |
| H04W 88/06 | (2009.01) | |

(52) U.S. Cl.
CPC ......... *H04L 49/9036* (2013.01); *H04W 88/06* (2013.01)

(56) References Cited

U.S. PATENT DOCUMENTS

| | | | |
|---|---|---|---|
| 5,822,598 | A | 10/1998 | Lam |
| 5,886,645 | A * | 3/1999 | Eaton ........................ 340/7.22 |
| 6,148,377 | A | 11/2000 | Carter et al. |
| 6,233,224 | B1 * | 5/2001 | Yamashita et al. ........... 370/231 |
| 6,247,057 | B1 | 6/2001 | Barrera, III |
| 6,260,158 | B1 * | 7/2001 | Purcell et al. ................. 714/10 |
| 6,526,487 | B2 * | 2/2003 | Ohran et al. ................ 711/162 |
| 6,597,919 | B1 * | 7/2003 | Kumar et al. ............... 455/510 |
| 6,601,093 | B1 | 7/2003 | Peters |
| 6,604,140 | B1 | 8/2003 | Beck et al. |
| 6,871,257 | B2 * | 3/2005 | Conley et al. ............... 711/103 |
| 6,879,561 | B1 | 4/2005 | Zhang et al. |
| 6,909,721 | B2 | 6/2005 | Ekberg et al. |
| 6,931,502 | B2 * | 8/2005 | Ohran et al. ................. 711/162 |
| 6,976,186 | B1 * | 12/2005 | Gardner ........................ 714/4.4 |
| 7,110,405 | B2 | 9/2006 | Divivier |
| 7,162,569 | B2 * | 1/2007 | Conley et al. ............... 711/103 |
| 7,352,998 | B2 | 4/2008 | Palin et al. |
| 7,549,080 | B1 * | 6/2009 | Gardner et al. ............ 714/6.12 |
| 7,567,570 | B2 * | 7/2009 | Grass ........................... 370/394 |
| 7,590,097 | B2 | 9/2009 | Ekberg et al. |
| 7,627,767 | B2 * | 12/2009 | Sherman et al. ............. 713/189 |
| 7,668,565 | B2 | 2/2010 | Ylanen et al. |
| 7,693,952 | B2 * | 4/2010 | Limprecht ............. G06F 9/546 709/206 |
| 7,697,893 | B2 | 4/2010 | Kossi et al. |
| 7,787,367 | B2 * | 8/2010 | Gusat et al. ................. 370/229 |
| 8,320,373 | B2 * | 11/2012 | Iraninejad ............... H04L 49/90 370/389 |
| 8,576,861 | B2 * | 11/2013 | Cardona et al. ............. 370/412 |
| 9,119,180 | B2 * | 8/2015 | Palin .................. H04W 76/021 |
| 2001/0051981 | A1 | 12/2001 | Davison et al. |
| 2002/0080719 | A1 * | 6/2002 | Parkvall et al. .............. 370/235 |
| 2002/0150045 | A1 * | 10/2002 | Vogtmeier et al. ........... 370/229 |
| 2003/0100308 | A1 | 5/2003 | Rusch |
| 2003/0231598 | A1 * | 12/2003 | Venkataraman et al. ..... 370/252 |
| 2003/0236890 | A1 | 12/2003 | Hurwitz et al. |
| 2004/0019640 | A1 | 1/2004 | Bartram et al. |
| 2005/0003822 | A1 | 1/2005 | Aholainen et al. |
| 2005/0013259 | A1 | 1/2005 | Papoushado et al. |
| 2005/0066033 | A1 | 3/2005 | Cheston et al. |
| 2005/0071879 | A1 | 3/2005 | Haldavnekar et al. |
| 2005/0097087 | A1 | 5/2005 | Punaganti et al. |
| 2005/0114448 | A1 | 5/2005 | Skomra et al. |
| 2005/0138173 | A1 | 6/2005 | Ha et al. |
| 2005/0193056 | A1 | 9/2005 | Schaefer et al. |
| 2005/0193106 | A1 | 9/2005 | Desai et al. |
| 2005/0254472 | A1 | 11/2005 | Roh et al. |
| 2006/0140146 | A1 | 6/2006 | Funk et al. |
| 2006/0221933 | A1 * | 10/2006 | Bauer ................... H04W 28/18 370/352 |
| 2006/0259606 | A1 | 11/2006 | Rogers et al. |
| 2007/0058630 | A1 | 3/2007 | Fujimoto |
| 2007/0112915 | A1 * | 5/2007 | Klassen et al. ............... 709/206 |
| 2007/0141984 | A1 | 6/2007 | Kuehnel |
| 2007/0180073 | A1 | 8/2007 | Paul et al. |
| 2007/0204275 | A1 * | 8/2007 | Alshab et al. ................ 719/313 |
| 2007/0280111 | A1 * | 12/2007 | Lund ............................. 370/235 |
| 2007/0280277 | A1 * | 12/2007 | Lund ............................. 370/412 |
| 2011/0002344 | A1 * | 1/2011 | Palin ....................... H04L 47/10 370/428 |

FOREIGN PATENT DOCUMENTS

| | | |
|---|---|---|
| CN | 1949697 | 4/2007 |
| CN | 1949698 | 4/2007 |
| EP | 1542409 A | 6/2005 |
| EP | 1758312 A1 | 2/2007 |
| EP | 1858210 A1 | 11/2007 |
| WO | 2004008793 A | 1/2004 |
| WO | 2007095966 A1 | 8/2007 |

OTHER PUBLICATIONS

Lee et al., "Protocols for Service Discovery in Dynamic and Mobile Networks", International Journal of Computer Research, vol. 11, No. 1, 2002, pp. 1-12.

The Salutation Corsortium, "Salutation Architecture Specification (Part 1), Version 2.1" Salutation Architecture Specification, XX, XX, Dec. 31, 1999, i-v, 1.

Suoranta et al., "New Directions in Mobile Device Architectures", Digital System Design: Architectures, Methods and Tools, 2006. DSD 200 6. 9th Euromicro Conference on, IEEE, PI, Jan. 1, 2006, pp. 17-26.

Lapetelainen et al., "Networked Systems, Services and Information", NOTA2008, 1st International network on Terminal Architecture Conference, Jun. 11, 2008, pp. 1-7.

Kronlof et al., "Advances in Design and Specification Languages for Embedded Systems", Jul. 19, 2007, Springer, Netherlands.

Desoli et al., "An Outlook on the Evolution of Mobile Terminals: From monolithic to modular multiradio, multiapplication platforms", IEEE Circuits and Systems Magazine, IEEE Service Center, New York, vol. 6, No. 2, Jan. 1, 2006, pp. 17-29.

Dobrev et al., "Device and Service Discovery in Home Networks with OSGi", In-Home Networking, IEEE Communications Magazine, Aug. 2002, 7 pages.

Miaoqing, "Service Discovery between Multiple Home Networks", TKK T-110.5190 Seminar on Internetworking, Mar. 4-5, 2007.

International Search Report and Written Opinion of the International Searching Authority for corresponding Patent Cooperation Treaty Application No. PCT/IB2007/054550 dated Oct. 15, 2008, 12 pages.

Se Gi Hong, et al: "Accelerating Service Discovery in Ad-Hoc Zero Configuration Networking" Global Telecommunications Conference, 2007. Globecom '07. IEEE, IEEE, Piscataway, NJ, USA, Nov. 1, 2007 (Nov. 1, 2007), pp. 962-965, XP031196113 ISBN: 978-1-4244-1042-2, section II.

Celeste Campo, et al: "DNS-Based Service Discovery in Ad Hoc Networks: Evaluation and Improvements" Personal Wireless Communications Lecture Notes in Computer Science; LNCS, Springer Berlin, DE, vol. 4217, Jan. 1, 2006 (Jan. 1, 2006), pp. 111-122, XP019044018 ISBN: 978-3-540-45174-7, section 2.

Stuart Cheshire; Marc Krochmal, Apple Computer, et al: "DNA-Based Service Discovery; draft-cheshire-dnsext-dnssd-04.text" IETF Standard-Working-Draft, Internet Engineering Task Force, IETF, CH, No. 4, Aug. 10, 2006 (Aug. 10, 2006), XP015046478 ISSN: 0000-0004, section 14.

International Search Report and Written Opinion for PCT/IB2008/053759 dated Mar. 27, 2009, 15 pages.

Quiroz, et al., "Version vectors based synchronization engine for mobile devices", Proceeding PDCN'07 Proceedings of the 25th conference on Proceedings of the 25th IASTED International Multi-Conference: parallel and distributed computing and networks 2007.

Final Technology Evaluation Report SIRENA Service Infrastructure for Real-time Embedded Networked Applications ITEA 02014 Project Reference WP2/110 Version V1.0 Author(s) / Organisation SIRENA Consortium Date May 14, 2004.

Lent, R.; "Smart packet-based selection of reliable paths in ad hoc networks" Design of Reliable Communication Networks, 2005. (DRCN 2005). Proceedings.5th International Workshop on Oct. 16-19, 2005 pp. 5 pp.

International Search Report and Written Opinion for PCT/FI2008/050242, dated Aug. 18, 2008, 12 pages.

(56) References Cited

OTHER PUBLICATIONS

Raverdy et al., "Efficient Context-aware Service Discovery in Multi-Progtocol Pervasive Environments", Mobile Data Management, 7th International Conference, Conference Proceedings Article, IEEE, May 10, 2006.
Raverdy et al., "A Multi-Protocol Approach to Service Discovery and Acces in Pervasive Environments", Mobile and Ubiquitous Systems: Networking & Services, 2006 Third Annual International Conference on Jul. 2006, IEEE 2006, pp. 1-9.
Kim et al., "Service Discovery Using FIPA-Compliant AP to Support Scalability in Ubiquitous Environments", Proceedings of the Fourth Annual ACIS International Conference on Computer and Information Science on 2005, pp. 647-652.
Scholten et al., "Secure Service Discovery in Home Networks", International Conference on Consumer Electronics, 2006, ICCE '06, 2006 Digest of Technical Papers, Jan. 7-11, 2006, pp. 115-116.
International Search Report and Written Opinion for PCT/IB2008/052437, dated May 1, 2009, 14 pages.
Office Action from European Patent Application No. 08776431.2, dated Aug. 2, 2010, 6 pages.
Rekimoto et al., "A Multiple Device Approach for Supporting Whiteboard-Based Interactions", Chi '98. Human Factors in Computing Systems, Conference Proceedings, Los Angeles, CA, Apr. 18-23, 1998.
Frank et al, "A Customizable Shared Information Space to Support Concurrent Design", Computers in INdustry, Elsevier Science Publishers, Amsterdam, NL, vol. 48, No. 1, May 1, 2002, pp. 45-57.
Tandler, "Software Infrastructure for Ubiquitous Computing Environments: Supporting Synchronous Collaboration with Heterogeneous Devices", Lecture Notes in Computer Science, LNCS, vol. 2201/2001, Jan. 1, 2001, pp. 95-115.
International Search Report and Written Opinion for corresponding Patent Cooperation Treaty Application No. PCT/IB2008/050711, dated Feb. 2, 2009, 14 pages.
Sttenkiste, "A Systematic Approach to Host Interface Design for High Speed Networks", Computer, IEEE Service Center, Los Alamitos, CA, US, vol. 27, No. 3, Mar. 1994, pp. 47-57.
Kliazovich et al., "A Delayed-ACK Scheme for MAC-Level Performance Enhancement of Wireless LANs", Telecommunications and Networking—ICT 2004; [Lecture Notes in Computer Science; ; LNCS], Springer-Verlag, Berlin/Heidelberg, vol. 3124, Jul. 2004, pp. 1289-1295.
International Search Report and Written Opinion of the International Searching Authority for PCT/IB2008/050709, dated Feb. 25, 2009, 18 pages.
Eriksson et al., "Providing Quality of Service in Always Best Connected Networks", IEEE Communicaitons Magazine, IEEE Service Center, Piscataway, US, vol. 41, No. 7, Jul. 2003, pp. 154-163.
Suoranta et al., "New Directions in Mobile Device Architectures", Digital System Design: Architectures, Methods and Tools, 2006. DSD 200 6, 9th Euromicro Conference on IEEE PI, Jan. 2006, pp. 17-26.
Steenkiste, P. A., "A Systematic Approach to Host Interface Design for High-Speed Networks", Computer, IEEE Service Center, Mar. 1994, pp. 47-57 and pp. 12-13.
EP Communication dated Aug. 22, 2016 for European Patent Application No. 08719493.2, 6 pages.

* cited by examiner

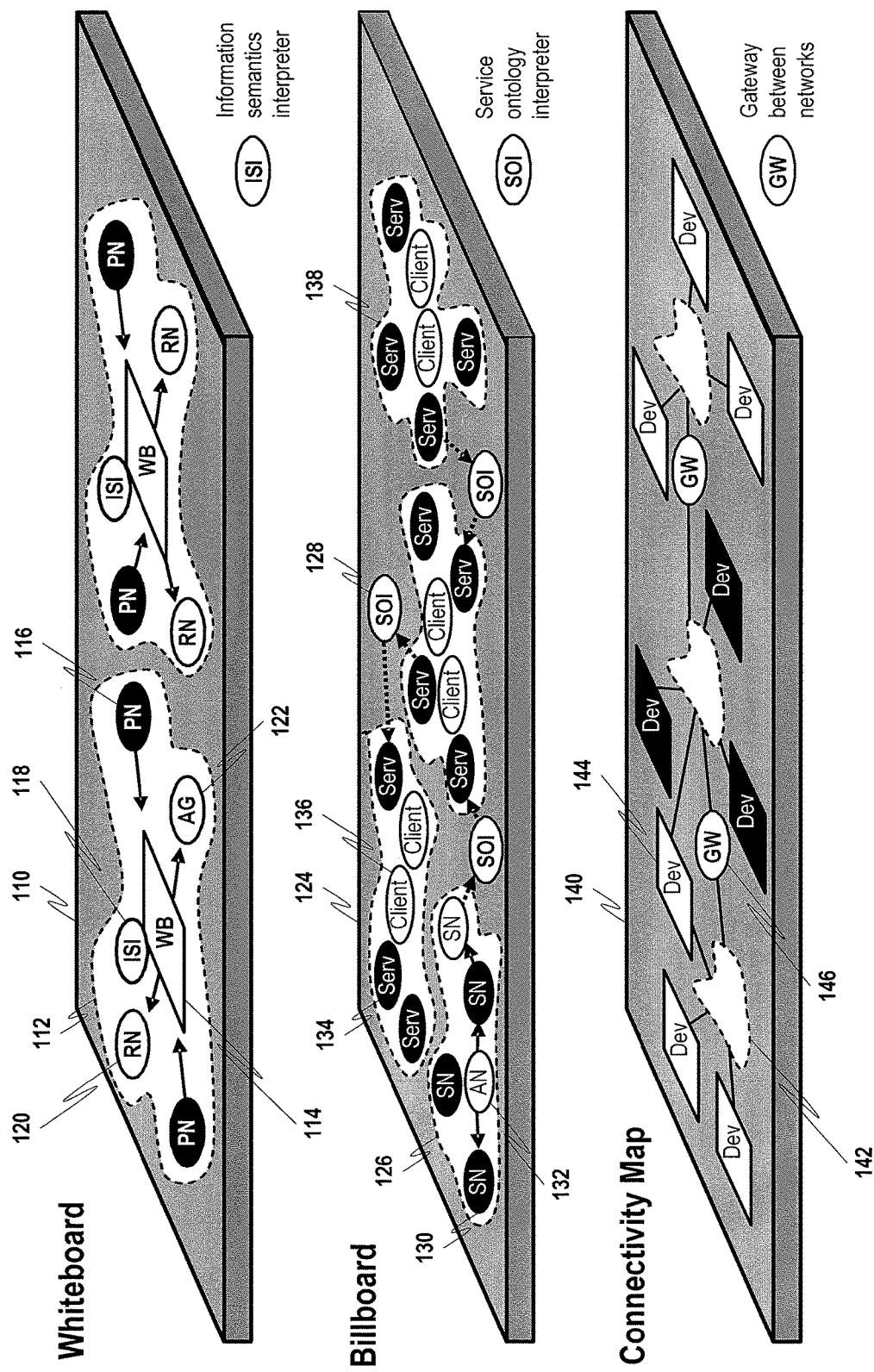

BUFFER CONTROL FOR MULTI-TRANSPORT ARCHITECTURES

BACKGROUND OF INVENTION

1. Field of Invention

The present invention relates to a communication architecture, and more specifically, to a communication architecture for establishing connectivity between devices using one or more transports.

2. Background

In general, software programs may include instruction sets that are executable by a processor, and are further organized to receive input (e.g., data) for use in a calculation or determination resulting in an output. Software technology has evolved to transform these individual instruction sets into program modules that may in turn be integrated together to form the more complex programs. Today's more-sophisticated software programs may receive various forms of input such as raw data, for example as stored in magnetic or optical storage, user input through various known types of user interfaces, measured or monitored information converted to electronic information from electronic and/or electromechanical sensors, etc.

In some instances, programs may be configured to produce data usable by other software applications. However, a problem may be presented in conveying the information from one program to another. If the relationship is known before the programs are created, then a specific strategy may be devised to convert one program's output into another program's input. Traditionally this strategy has led to functional but rigid software applications, requiring frequent and possibly substantial revisions due to changes in functionality, platform, architecture, etc.

Recently, more flexible modular architectures for sharing information amongst programs are emerging. These programs use modular program units, or "nodes," that can be revised or replaced without having to interrupt overall device operation. In particular, some nodes may contribute information to a shared memory space, while others may read previously stored information from the shared memory space or may combine these functions. Other types of nodes may also be specialized to provide communication services. Using this strategy, altering program elements (e.g., altering, adding or deleting one or more nodes) may not affect nodes that are actively communicating with other nodes, and memory usage may be optimized since information may be stored in a single location while being accessible to all of the nodes.

While this strategy can conceptually be implemented in a single device platform, no effective solution currently exists for coupling nodes on different devices. Problems currently exist with respect to facilitating the establishment of a transport (e.g., a wireless communication medium) with which one node may correspond with another. Further, if a selected transport becomes unavailable, for example, because of environmental interference, range and or traffic issues, then under the application of current practices a whole new connection configuration would have to be devised. In addition, even if another transport was configured manually or as an automated backup to the original transport, a substantial risk may still exist if the alternative transport isn't available (e.g., is a particular transport that is also experiencing problems). A risk may further exist with respect to lost data (e.g., dropped packets) as data already allocated to resources supporting a failing or failed transport cannot be recovered, and therefore, this information may have to be resent and/or recreated. This recovery process will unavoidably occupy system resources and delay the sending of any following data, resulting in a negative impact on the overall quality of service (QoS) provided by the communication device.

SUMMARY

The present invention may include at least a method, computer program, device and system for automating connection management in a manner that may be transparent to any actively communicating applications operating in a Network on Terminal Architecture (NoTA). An application level entity, such as an application node, may access another node by making a request to a high level communication structure via a high level interface. The high level structure may then interact with a lower level structure in order to facilitate a connection to a programmatic element on another device, for example, via a particular communication transport.

In at least one embodiment of the present invention, information provided from one or more application and/or service level entities for transmission to another device may initially be stored in a transport-independent data buffer. At a later time, for example after a particular transport has been selected for conveying this information to the other device, the information may be forwarded to a lower level transport-specific data buffer corresponding to the selected transport as part of the preparation for transmission. The information in the transport-specific buffer may then be sent to the other device via the selected transport.

In accordance with the above example, a strategy may be employed to account for possible problems that may be encountered in the selected transport. A failure may occur in a communication link conducted using the selected transport due to, for example, physical disconnection of a communication line, moving out of range, environmental interference, etc. As a result, information already transferred to the transport-specific buffer in preparation for transmission may be lost. To account for this situation, various embodiments of the present invention may retain a copy of the information that was most recently passed to the transport-specific data buffer in the transport-independent data buffer until transport-related resources can confirm that the transmission was successful. In this way, corrective action in response to a failed transport may be performed expeditiously, which may reduce any impact on QoS.

More specifically, the transport-independent data buffer may only delete the retained copy of the previously-passed information after a some sort of confirmation of receipt message has been received from the other device. This is not to say that transport itself cannot also attempt to resend the information, for example, until some threshold condition has been met. However, if a determination is made that the currently selected transport can no longer provide a viable link, various embodiments of the present invention may then take action to establish a link with an alternative transport. After a new connection has been established using the newly selected transport, the transport-independent data buffer may send the retained copy of the information that may have been lost when the previous transport failed to the transport-specific data buffer corresponding to the newly selected transport in preparation for retransmission.

DESCRIPTION OF DRAWINGS

The invention will be further understood from the following detailed description of various exemplary embodiments, taken in conjunction with appended drawings, in which:

FIG. 1B discloses a structural diagram of various exemplary layers of an inter-device Network on Terminal Architecture (NoTA) including a Whiteboard-type exchange service in accordance with at least one exemplary embodiment of the present invention.

DESCRIPTION OF EXEMPLARY EMBODIMENTS

While the invention has been described below in a multitude of exemplary embodiments, various changes can be made therein without departing from the spirit and scope of the invention, as described in the appended claims.

I. Network on Terminal Architecture (NoTA)

Network on Terminal Architecture (NoTA) is a service based interconnect-centric platform architecture usable in various electronic apparatuses including wired and/or wireless (e.g., mobile) devices. The interconnect-centric approach incorporated in NoTA may allow any physical sub-system to directly communicate with other sub-systems while supporting multiple parallel connections. Direct connections are possible due to simple switches optimized for the underlying physical media. NoTA interconnect architecture and related interfaces may be complexity and performance optimized for service and data communication, and may be designed in such a way that different communication media technologies can be utilized.

Figure 1A:
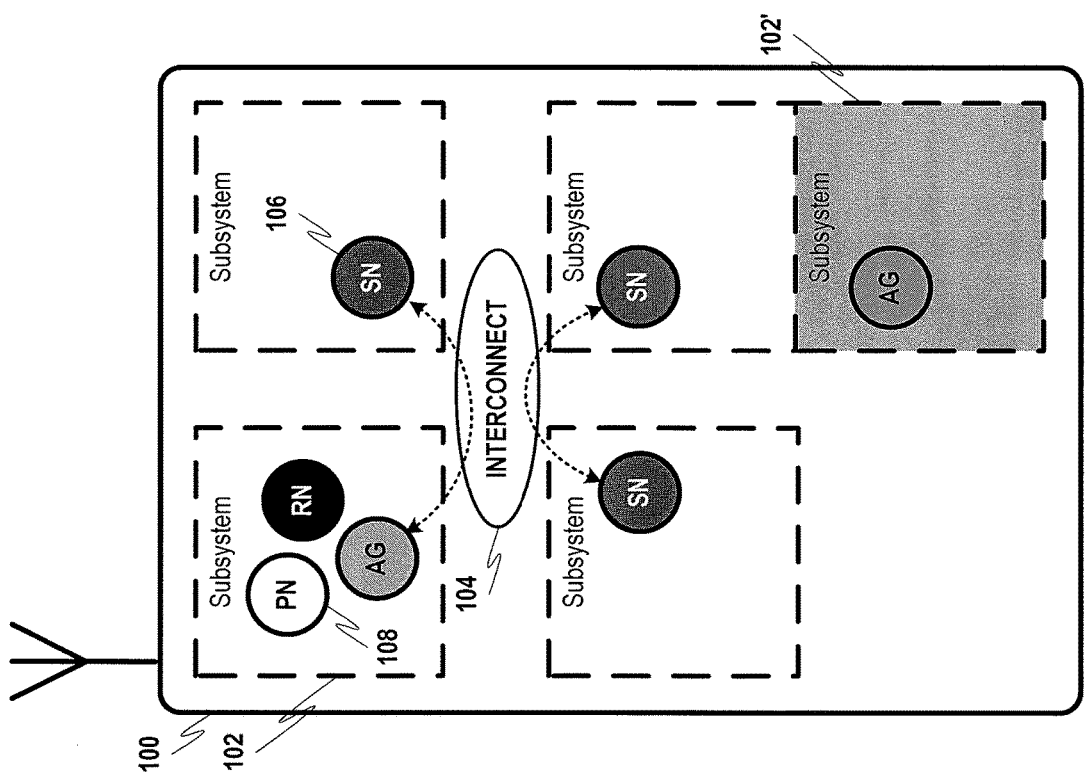
FIG. 1A discloses an exemplary intra-device Network on Terminal Architecture (NoTA) in accordance with at least one exemplary embodiment of the present invention.

FIG. 1A discloses an example of NoTA implemented in a single device 100. The NoTA platform architecture consists of subsystems 102 connected together via interconnects as shown, for example, at 104. It is also possible for subsystems to be directly coupled to other subsystems as shown at 102' in FIG. 1A. A coupled configuration may exist in a scenario where subsystems frequently cooperate during operation. FIG. 1A also discloses service nodes (SN) 106 and application nodes (AN) 108 (e.g., PN, RN and AG) that may be mapped into subsystems 102 and 102'. Subsystems in NoTA context may encompass all of the resources (e.g., computing, software, peripherals, etc.) required to implement the services and/or applications running in the corresponding subsystem.

Now referring to FIG. 1B, a more detailed disclosure of NoTA as it may be applied to a multiple-device system, in accordance with at least one embodiment, is now disclosed. The general architecture may be explained in terms of three exemplary operational levels: whiteboard 110, billboard 122 and connectivity map 140. Whiteboard 110 is an example of an application and service level that may comprise the highest level of operation in this architecture. At this level, operational groups 112 may be formed including whiteboards 114 and various application nodes 108. Application nodes 108 may correspond to application existing on a plurality of wireless communication devices, and may be utilized to exchange information between these applications, for example, by placing data into, and removing data from, whiteboard 114. For example, the various nodes may consist of proactive nodes (PN) 116 that may place information into whiteboard 114, reactive nodes (RN) 120 that may take information from whiteboard 114 and agent nodes (AG) 122 that may operate either in a PN or RN mode depending on the particular application. Information semantics interpreter (ISI) 118 may be utilized to link different whiteboards 114 together. Utilizing these constructs, whiteboard 114 may provide a standardized means for application interaction that overcomes many incompatibilities.

Billboard level 124 may facilitate interaction between services available on the one or more devices. Services 134 and clients 136 that may utilize these services may be organized in service domains 126. In at least one scenario, service domains 126 may correspond to a particular protocol, such as UPnP, BT SDP, Bonjour, etc. In each service domain 126, services 134 may be represented by service nodes (SN) 130, and likewise, application nodes (AN) 132 may be established to correspond to applications. Further, service domains 126 may interact utilizing service ontology interpreters (SOI) 128. SOI 128 may allow service domains 126 to interact with other service domains (e.g., 138), even if service domain 138 resides on another wirelessly-linked device (e.g., to provide access information to service domains 126).

Connectivity map 144 may define connectivity methods/possibilities and topology for different devices participating in sharing resources in order to support a top level, for example whiteboard 110, and also billboard-type services in billboard level 122. In at least one exemplary embodiment of the present invention, devices 144 may be linked in directly connected groups 142. Examples of directly connected groups of devices (Dev) 142 may include devices connected via Bluetooth™ piconet, a WLAN network, a wUSB link, etc. Each directly connected group of devices 142 may further be linked by gateways (GW) 146.

II. Underlying Communication Elements that May Couple Subsystems

Figure 2:
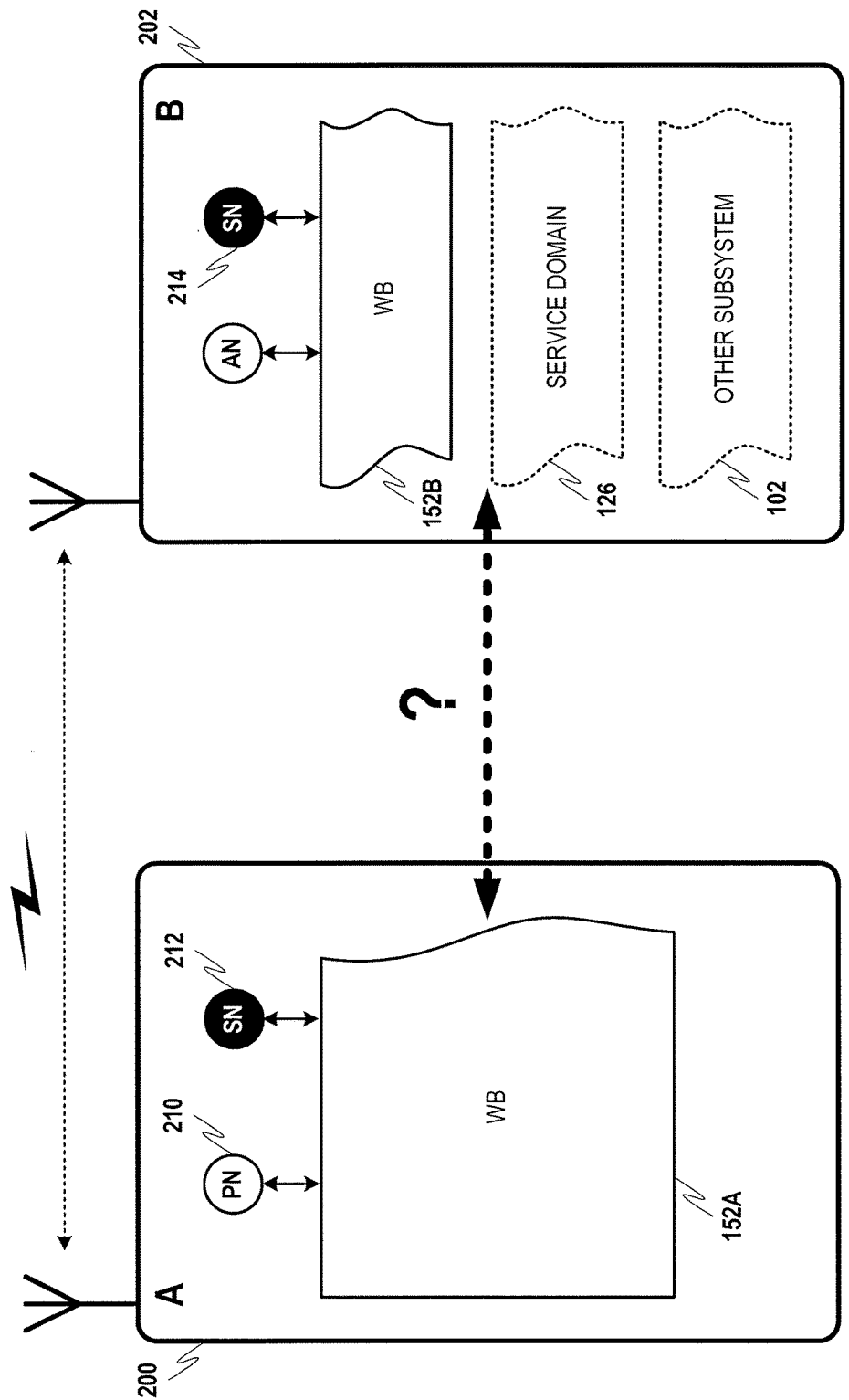
FIG. 2 discloses an exemplary need for underlying connectivity establishment in accordance with at least one exemplary embodiment of the present invention.

While examples of inter-node interaction involving application and/or service nodes has been described, no detailed discussion regarding how the devices may be coupled via wired or wireless communication, or the management of this connection, has been offered. FIG. 2 discloses an example scenario wherein application and/or service nodes may reside on two different devices 200 and 202. Whiteboard sections 152A and 152B also reside on these devices, respectively, ideally providing a common memory space via which the nodes may interact. However, interaction with a common memory space in the form of whiteboard 152 may initially depend upon the establishment a wireless connection between whiteboard sections 152A and 152B.

While an exemplary whiteboard 152 divided into two sections 152A and 152B has been utilized for the sake of explanation in the present disclosure, the facilitation of node interaction is not specifically limited to this scenario. For example, while proactive node (PN) 210 coupled to whiteboard section 152A may utilize SN 212 and 214 to interact with whiteboard section 152B as shown in FIG. 2, it is further conceivable that whiteboard 152A may allow PN 210 access to other shared memory spaces, such as service domain 126 (e.g., to allow an application to access a desired service, like a printer service), or any other exemplary subsystem 102 as previously discussed in accordance with various embodiments of the present invention. Regardless of the node/device configuration, interaction between nodes may not be problematic on a single device in view of the locally interconnected subsystems However, this interaction may become more difficult with multiple devices linked, for example, over one or more wireless transports.

Figure 3A:
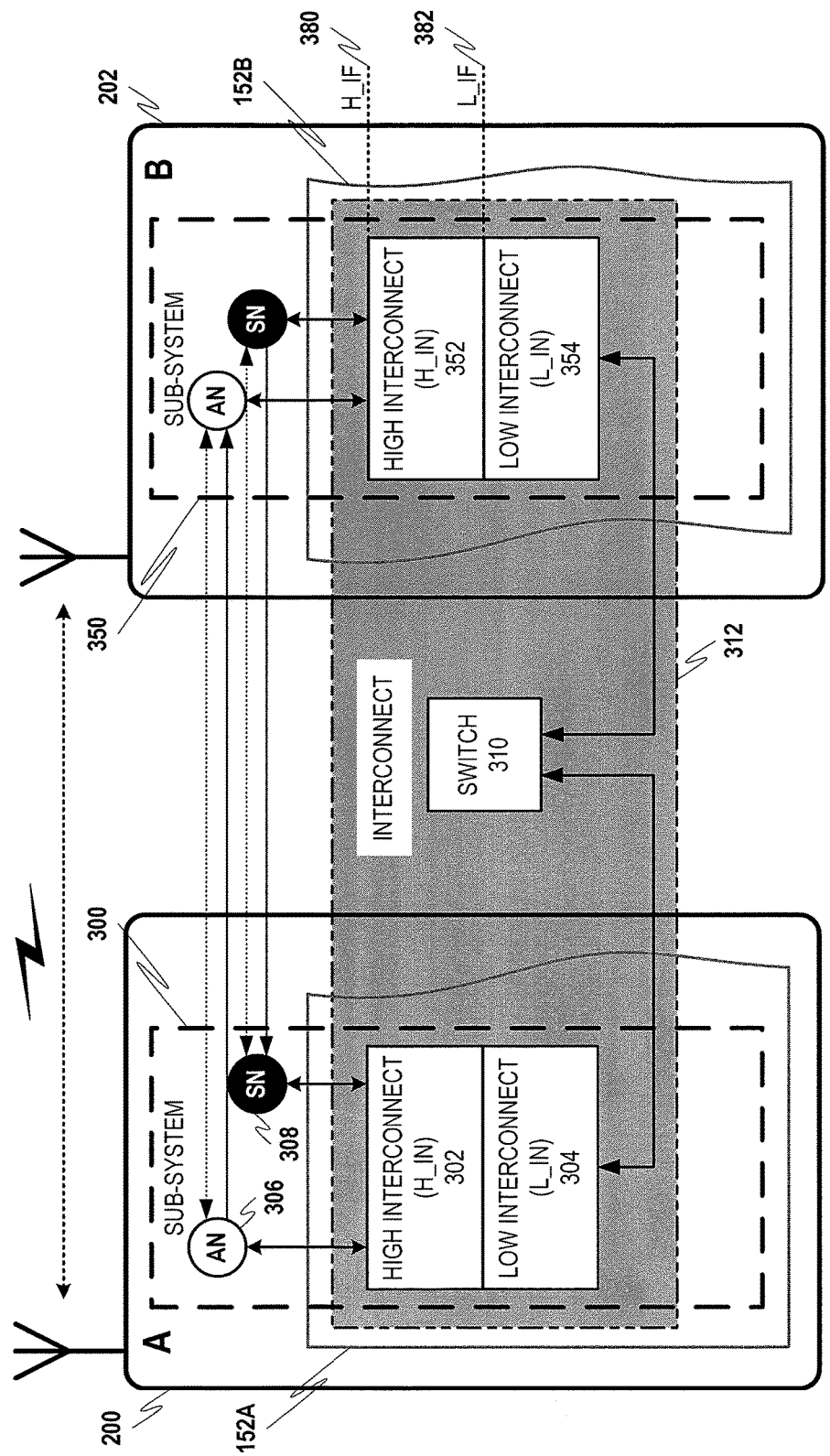
FIG. 3A discloses a structural example of communication establishment in accordance with at least one exemplary embodiment of the present invention.

FIG. 3A discloses an example of an underlying logical architecture that may be utilized in implementing NoTA in accordance with at least one exemplary embodiment of the present invention. NoTA may be configured as multiple subsystems (e.g., 300 and 350) coupled by interconnect 312. As previously set forth, a communication link between devices that may be both established and managed by a lower operational level may facilitate the routing of messages for higher level subsystems, such as sections (152A and 152B) of the same shared memory space (whiteboard) 152, without the actual involvement of the higher levels in any communication configuration. NoTA interconnect 312 may comprise two layers: High Interconnect (H_IN) layer 302 and Low Interconnect (L_IN) layer 304 coupled to corresponding H_IN 352 and L_IN 354 by switch 310. The various communication layers may further interact over interfaces (abbreviated "IF" in FIG. 3). For example, H_IF 380 may serve as the interface between the application level and H_IN 302/352, while L_IF 382 may serve as the interface between H_IN 302/352 and L_IN 304/354. Low interconnect layer 304 may include ISO/OSI layers L1-L4 and may provide transport socket type interface upwards. High Interconnect layer 302 may act as the middleware between L_IN 304 and the higher level Application nodes 306 (AN) and Service nodes (SN) 308 residing in subsystems like 300 and 350. Key H_IN 302 functionality may include providing client nodes (AN 306 or SN 308) a direct access to services without having to disclose the location of the latter (e.g., transparent at the top level). All communication establishment may be connection-oriented, meaning that before any service or data communication may take place, connection setup procedures must first be carried out. Security features have been added to countermeasure identified threats. NoTA is an architecture that may be used to provide inter-device service access, making it possible to build independent subsystems providing both services and applications. In an exemplary implementation there may be several individual NoTA devices involved in direct inter sub-system communication.

Figure 3B:
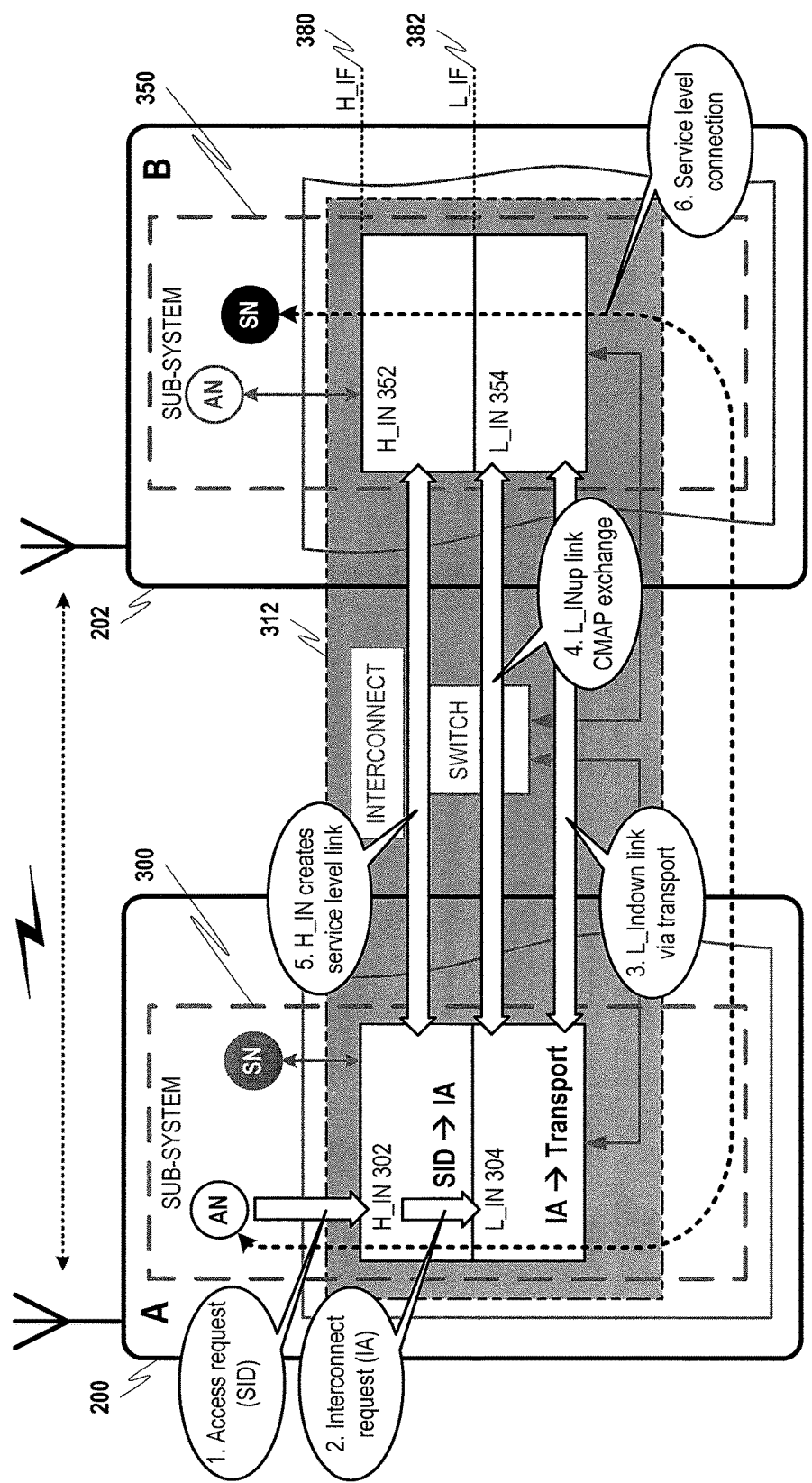
FIG. 3B discloses an example of establishing access to a target service residing in another device in accordance with at least one exemplary embodiment of the present invention.

Utilizing the previously described architecture, an example of establishing access to a service on another device via a wireless link, in accordance with at least one exemplary embodiment of the present invention, is disclosed in FIG. 3B. A node in the application/service level of subsystem 300 in device 200 desires to access a service. The service may be identified, for example, by a service description (SID). This service description may be used to locate and establish access to the desired service. In the H_IN level, the SID may be mapped to an Interconnect Address (IA) that may further identify the subsystem in which the service resides. In this example, the desired service resides in subsystem 350 in target device 202. In order to make an H_IN level connection with the subsystem offering this service, a transport must be selected that is suitable for making a connection between the devices. The IA may then be mapped to the selected transport in L_IN 304. In the example of FIG. 3B, a wireless link must be established because the devices are not coupled by a wired connection. This wireless link is established over interconnect 312 via the wireless transport. Once devices 200 and 202 are wirelessly coupled, H_IN level connection between subsystem 300 and 350 may be possible. In H_IN level 352 a corresponding H_IN protocol is usable to negotiate service usage. The (SID→IA) and (IA→transport) mapping is used only in subsystem 300 in order to build a connection with a proper subsystem offering the needed service (e.g., subsystem 350). As a result, upper level (e.g., application/service level) access may be established from a requesting node in device 200 to a service that is able to fulfill the request, even though the service resides in device 202. This access may be facilitated by lower level link establishment via one or more transports.

III. Exemplary Connection Management Structures

Figure 4:
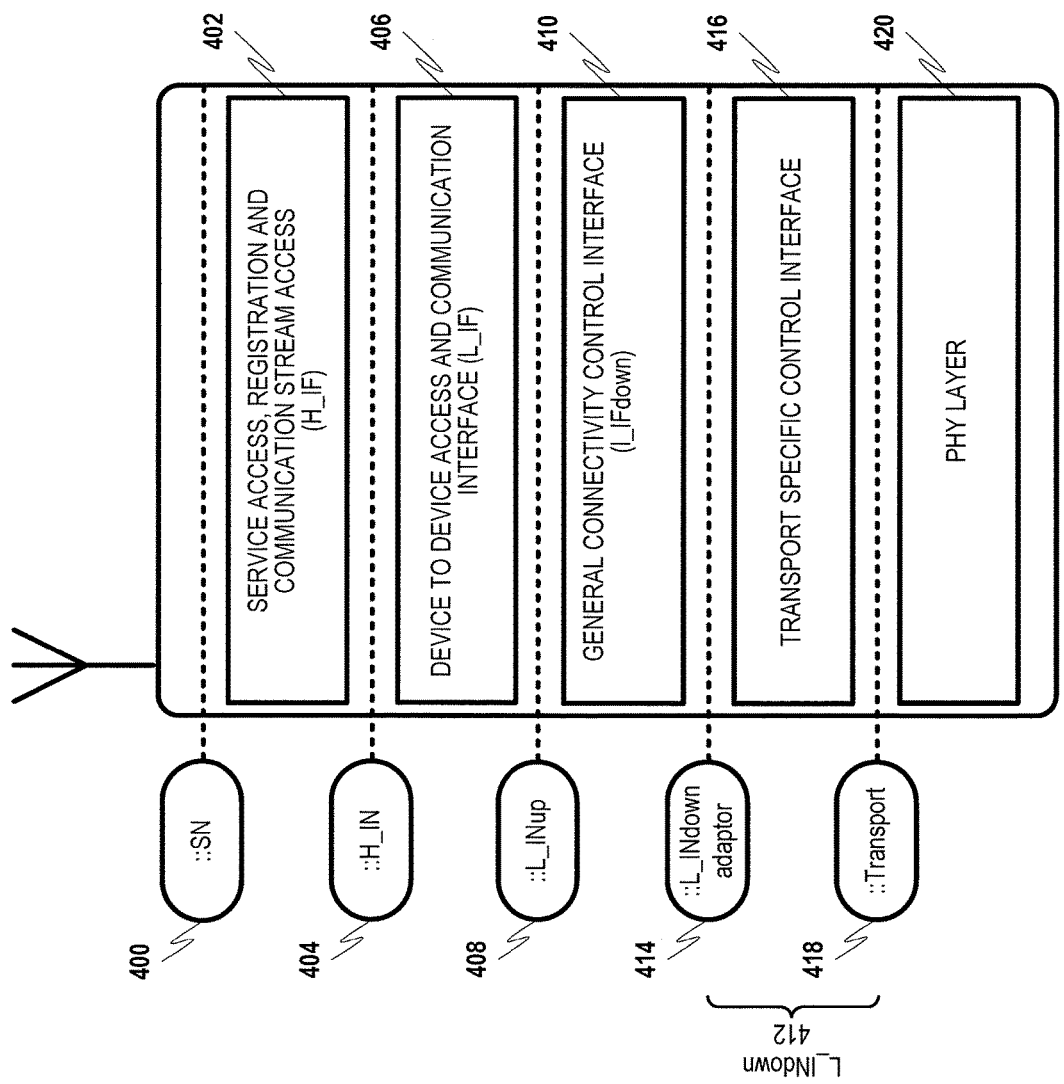
FIG. 4 discloses an example of various software levels and interfaces through which information may be conveyed in accordance with at least one exemplary embodiment of the present invention.

The present invention, in accordance with at least one embodiment, may be described in terms of the functionality of various architecture components and component relations. FIG. 4 describes the interaction of the various communication levels and examples of functions that may be performed by each level and its corresponding interface in accordance with at least one exemplary embodiment of the present invention. For example, 400 discloses an exemplary service node (SN) that may facilitate the set-up and establishment of connections supporting various application nodes (AN) such as 108 shown in FIG. 1A. The interface between the top application level and the H_IN level 404 may provide service access, registration and communication stream access via H_IF interface level 402. In accordance with at least one exemplary embodiment of the present invention, services may be identified by a Service Identification (SID). H_IN level 404 may then obtain device-todevice access and communication interface access to L_INup level 408 via L_IF interface level 406. The H_IN level access may be identified by an Interconnect Address (IA) which separates different devices/subsystems in high level middleware layer. A general connectivity control interface L_IFdown level 410 may then provide access from transport-independent L_INup level 408 to L_IN down 412 including transport-specific L_IN adaptors as disclosed at 414. In various embodiments of the present invention, there may be a specific L_IN adaptor 414 for each communication medium (e.g., transport 418), each being linked by transport-specific control interfaces 416. Wired and/or wireless transports 418 supported, for example in a mobile device, may then utilize the physical hardware and/or corresponding software in device PHY layer 420 to communicate. Overall, the service level may utilize an SID to identify different services, H_IN level middleware layer may then map this SID into a certain IA, which corresponds to an address of a device/subsystem where the respective service may be accessed in the high level middleware layer. L_INup level 408 may then map this IA to one or more physical connections (e.g., transports) that may offer connectivity to the device/subsystem that corresponds to the IA. L_INdown level 410 may then establish physical connections with the specific transport.

Figure 5:
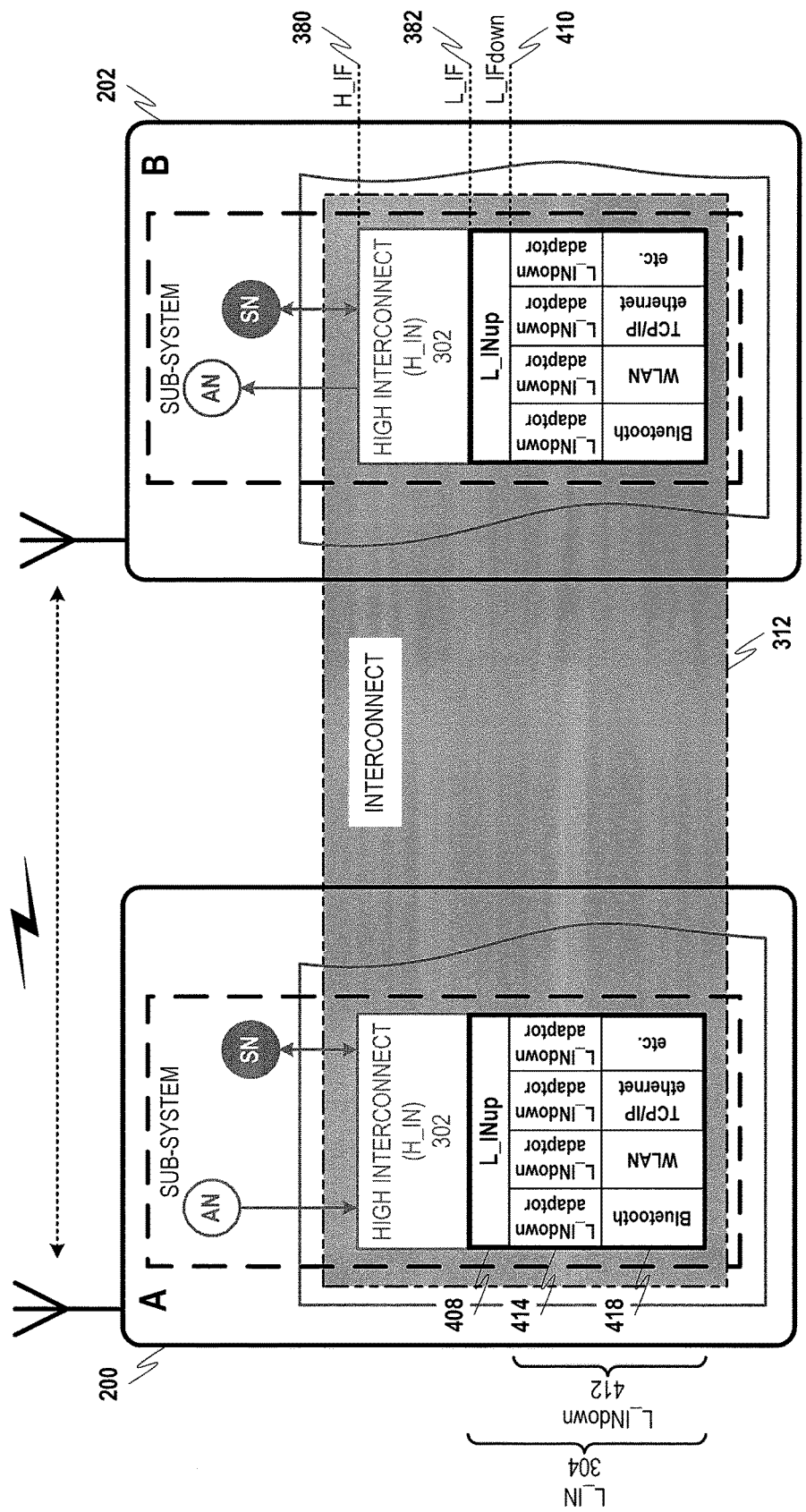
FIG. 5 discloses an exemplary configuration for the lower level communication structure in accordance with at least one exemplary embodiment of the present invention.

FIG. 5 depicts an exemplary low interconnect architecture (L_IN) 304, in accordance with at least one exemplary embodiment of the present invention. L_IN 304 may provide service upwards to H_IN 302 via L_IF interface 382, and may comprise a unified L_INup communication structure 408 and one or more L_INdown communication structures 412. L_INdown 412 may further include at least one L_INdown adaptor 414 corresponding to each transport 418 that may be utilized in a device. As a result, L_INup 408 may be transport-independent (e.g., L_INup operation does not change in dependence upon the transport in use), while L_INdown adaptors 414 in L_INdown 412 may be specifically configured for use with each transport 418. Each L_INdown adaptor 414 may provide service to L_INup 408 through one or more L_IFdown interface 410. L_IFdown interfaces 410 may be configured similarly for each transport 418 except in the addressing and access mechanism.

L_INup 408 may perform multiple functions in embodiments of the present invention. For example, activation and deactivation may be controlled in this layer of the communication structure. The L_IN activation process is controlled over the L_IF 382. During the activation process, the L_IN 304 may be configured to be able to use wireless and/or wired transports as L_IN transports. As a result of successful activation, L_IN 304 may then be able to resolve an Interconnect Address (IA) as well as IAs for the existing Resource Managers (IArm). L_INup 408 may use the query services provided to L_INdown 412 during this activation.

When active, L_IN 304 may be able to detect loss of a L_IN network connection. As a result, any earlier allocated IA and IArms may be released in order to, for example, automatically reconnect the network connection using the same or a different transport. The deactivation process is also controlled over L_IF 382. In the deactivation process, L_IN 304 is deactivated in respect of all available transports. During this process, the IA is released.

Figure 6:
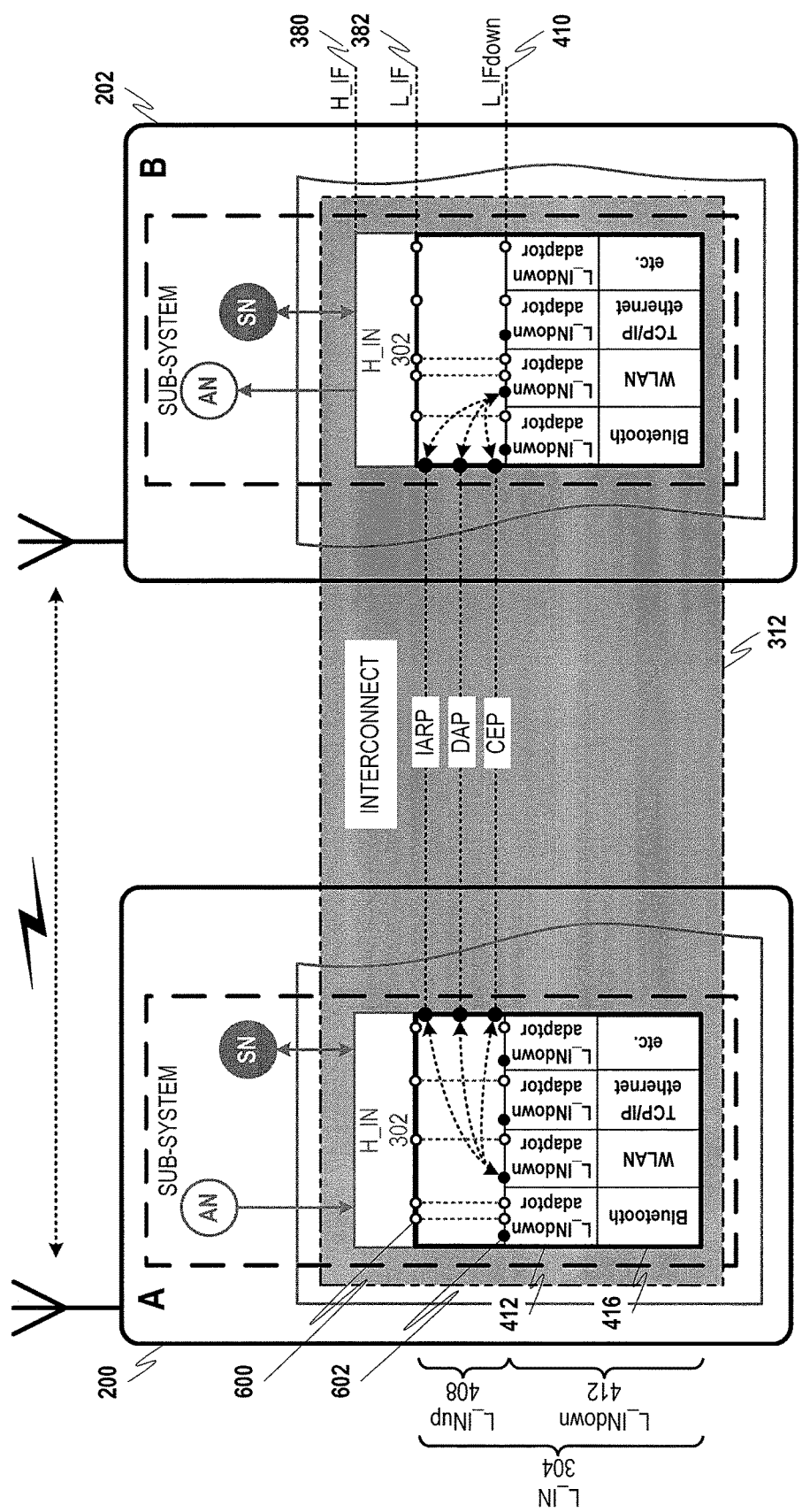
FIG. 6 discloses an example of connection establishment in accordance with at least one exemplary embodiment of the present invention.

The L_IN connection creation process may establish a L_IN-level connection between different devices such as shown in FIG. 6. This connection may utilize different types of transport technologies in-between the end-points. In general, the choice of transport may be transparent at the application level, since interfaces with which the nodes may interact may be transport-independent. However, there may be instances where applications and services (e.g., represented in the NoTA architecture by AN 306 and SN 308) may have requirements, or desired characteristics, regarding the connectivity that L_IN layer 304 may provide. L_IF interface 382 may therefore be equipped with a mechanism to enable a quality of service (QoS) parameter setup to monitor each connection. At this level, the quality of service parameters may not be bound to an actual transport since the transport technology used to carry out data would not be selected at this level. Rather, the QoS requirements may be mapped to an L_IN communication instantiation, or "socket," that are abstractions of the actual connection that upper protocols may use. The connectivity requirements may be achieved using, for example, buffer state-based transport selection and flow control. The interface does not have to address transport-specific parameters. Instead the requirements, or wishes, may be described in more universal manner.

In order for L_IN to carry out its function, a set of basic L_INup-L_INup connection protocols may be defined. All of these may be utilized by the L_INup communication structure 408, hence making the implementation of the L_INdown adapter 412 simple (e.g., because no generic L_INdown-L_INdown peer protocols are required). The following L_INup protocols may be defined for facilitating communication between L_IN communication structures existing in two separate devices (e.g., devices 200 and 202 as shown in FIG. 6):

A protocol that may provide a means to allocate and identify unique interconnect addresses for each device may be called an Interconnect Address Resolution Protocol (IARP) in accordance with at least one exemplary embodiment of the present invention.

A protocol that may provide a means to establish data connection establishment and disconnection between sockets may be called the Device Access Protocol (DAP) in accordance with at least one exemplary embodiment of the present invention.

A protocol that may provide a means to exchange connectivity map-type information between devices. This information (e.g., regarding connectivity in the device environment) may further be utilized to select optimal connectivity method when distributing information across the devices. This protocol may be called the Connectivity Environment Protocol (CEP) in accordance with at least one exemplary embodiment of the present invention.

IARP may be specified to provide inter-device NoTA architecture Interconnect Address (IA) resolution within a network of devices, in an ad-hoc communication connection, etc. IARP may contain four messages in order to retrieve and release a unique IA. In the example of FIG. 6, the IA resolution process may handle IA address allocation between devices as a connection is established. Address resolution may utilize IARP as a resource for supporting connection establishment. Address resolution may be centralized or distributed/autonomous requiring zero manual configuration. The data delivery process may manage data flow control between the sending device and the receiving device. L_IF ring-buffer based sockets may be used in this process. The data delivery process may further implement connection loss detection and recovery process in order to provide more reliable data delivery using inter-transport switching.

DAP may provide connectivity initialization, creation, and disconnection. L_IN layer internal interface, L_IFdown 410, may provide uniform way for DAP to access individual transports. Each transport needs an adaptor 412 which implements L_IFdown interface 410. FIG. 6 shows how the architecture scales from a transport-independent intra-device domain (e.g., L_INup 408) to transport-independent inter-device domain (e.g. L_INdown 412). For example, the depicted communication layers may be coupled data sockets 600 that may directly couple H_IN 302 and L_INdown 412 via transport-independent L_INup communication structure 408.

Inter-transport switch triggering decisions may be controlled in view of condition information obtained by monitoring the transmit (TX) and receive (RX) buffer fill levels. All data conveyance may be considered "Best Effort" (BE) type. Introduction of some simple QoS classes (e.g. BE, low-latency delivery, minimized power consumption, etc.) may then be possible while still keeping the overall implementation complexity of NoTA manageable. The connection loss and recovery process is a supplemental action in L_IN communication structure 304 that can be utilized for restoration and reconnection procedures that could not otherwise be handled in as part of the inherent abilities of resources operating at the transport level.

Part of the connection setup, data delivery, and connectivity recovery solutions may include sharing and distributing information about the connectivity in the surrounding environment by means of the CEP protocol. This method may retrieve information about the available connectivity technologies used by other surrounding devices and enables smart decision making procedures when choosing optimal transport to access devices and services. In FIG. 6, control sockets 602 for enabling L_INup-to-L_INup protocol communication are shown interacting with the TARP, DAP and CEP protocols in furthering inter-device communication.

The L_INdown communication structure 412 may provide other communication-related functionality. For example, a query operation may be an L_INdown internal function that is intended to provide information concerning transport-specific connection opportunities. This functionality may be tightly coupled with scene and connectivity maps by which information regarding the overall space/proximity/neighborhood connectivity may be obtained. The query function is mainly employed during the establishment of a connection.

A data delivery process may handle data flow control between the same transport peer entities (e.g., between L_IN up communication structures such as shown in FIG. 6). The same ring buffers may be used as in the previously described case with respect to L_IF. A transport-specific connection loss and recovery process may also be implemented in L_INdown 412. The implementation may substantially depend on the applied transport technology.

IV. Communication Management

Figure 7:
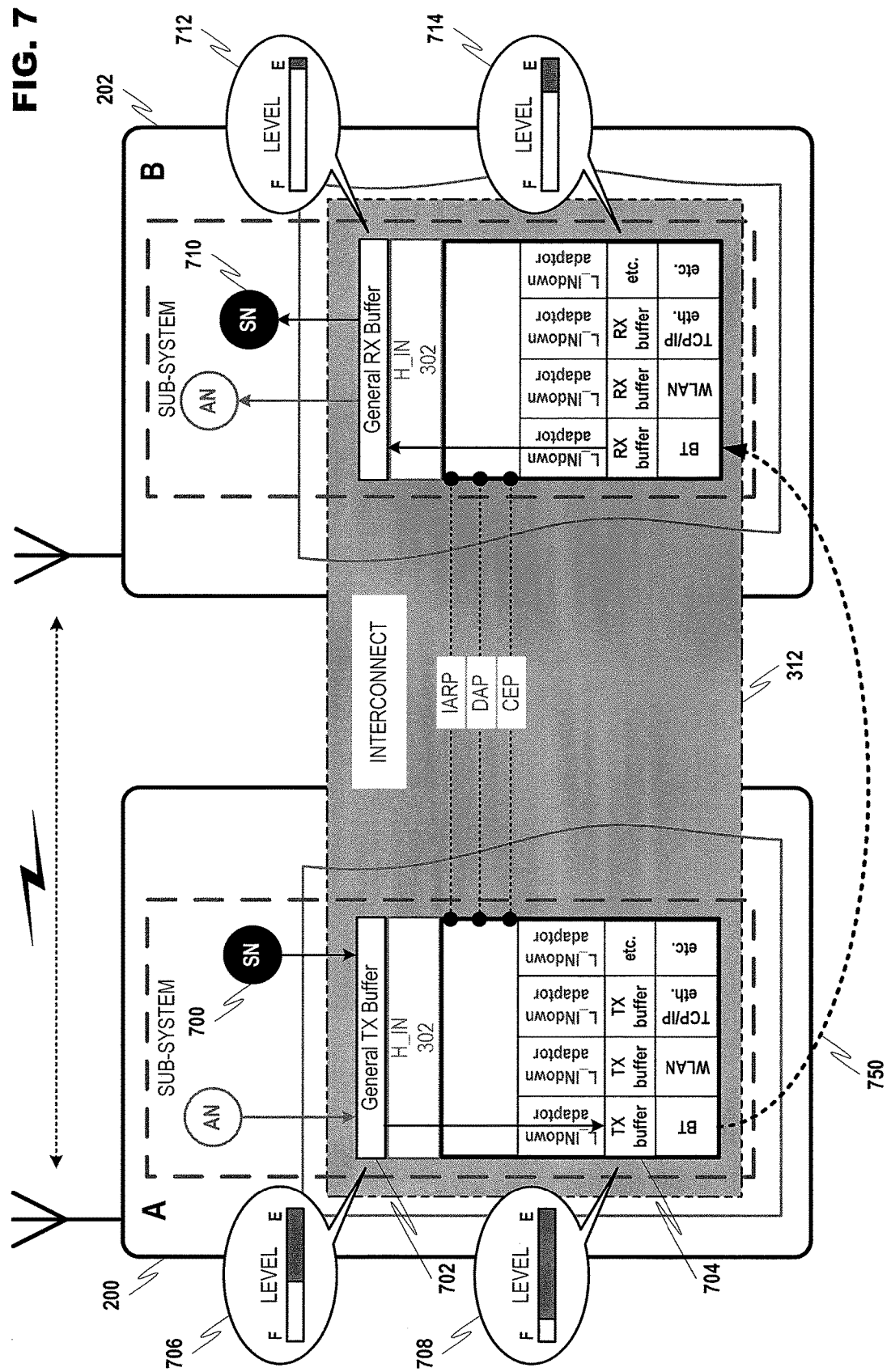
FIG. 7 discloses an example of buffer level condition factors in accordance with at least one embodiment of the present invention.

FIG. 7 discloses an exemplary implementation of the present invention, in accordance with at least one embodiment, wherein services (e.g., represented by SN 700) may produce data into general transmit buffer 702. While a one-way wireless transmission from device 200 to device 202 has been disclosed in FIG. 7 for the sake of explanation, the present invention is not limited to this specific example, and may be implemented to manage two-way communication via wired or wireless communication. Further, while FIG. 7 discloses an example of general buffers 702 located above interconnect structure 312 and transport-specific buffers 704 located within L_IN level 304, other possible configurations may include, for example, general buffer 702 also residing in L_IN level 304. Various control elements implemented in hardware and/or software (not pictured) may monitor buffer status as shown graphically at 706, 708, 712 and 714. Furthermore, while the present invention will be described with fixed buffer size, various embodiments may also incorporate dynamic buffer allocation which may be taken into account.

These control elements may identify one or more wireless transports appropriate to implement according to various factors including, for example, buffer level. In the exemplary scenario depicted in FIG. 7, SN produces information into general buffer 706 which is operating at a level as shown at 706. However, due to the speed limitations of wireless transport 750, the transport specific buffer 704 is approaching full. This may further affect buffers 712 and 714 by starving them of information. As a result, resources such as power, processing capacity, etc. may be utilized inefficiently due to the limitations imposed by the wireless transport, which could be the same transport that was utilized when, for example, communication was initially established.

Figure 8:
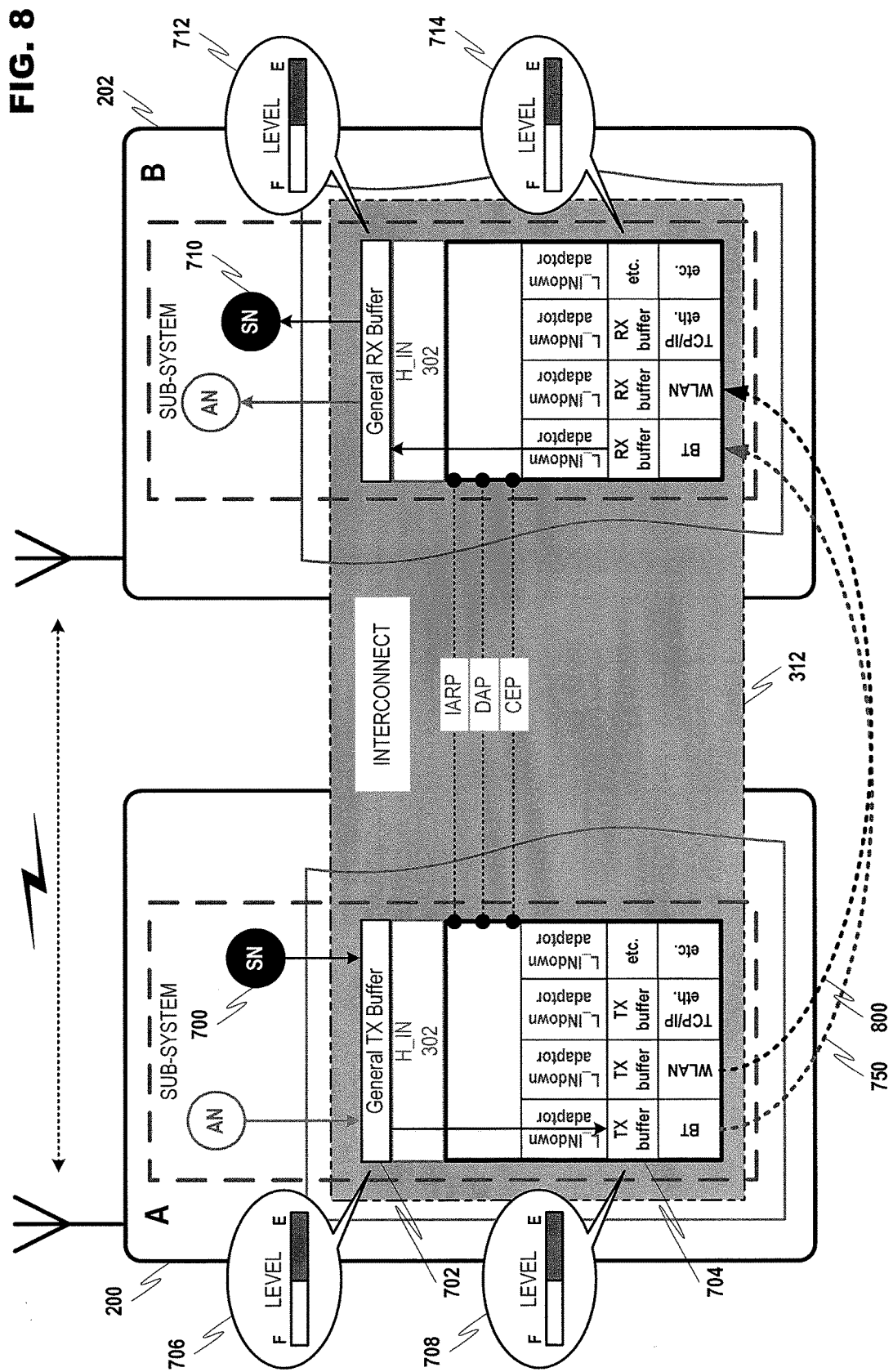
FIG. 8 discloses an example of the utilization of one or more wireless transports for controlling buffer levels in accordance with at least one embodiment of the present invention.

However, in accordance with at least one embodiment of the present invention, an exemplary implementation wherein co-operation of one or more wireless transports may help to resolve such a problematic scenario is disclosed in FIG. 8. For example, during a service search and initialization a low power low rate wireless transport 750 may be utilized. When service 700 is enabled, general buffer 706 may start to fill up because high speed service data cannot be delivered efficiently over transport 750. However, according to at least one embodiment, various control elements may utilize transport 750 to negotiate a switch to transport 800. For example, L_INup 408 may determine (e.g., through previously mentioned connectivity map 140) that high speed transport 800 can be used and may then facilitate a switch to high speed transport 800. After switching the active transport to bearer 800, the connection speed may be much faster, and therefore, an overflow of the various buffers may be prevented. The same strategy may also be implemented based on receiving device(s) characteristics, meaning that a frequently empty buffers 712 and 714 may indicate that the amount of data being received is too low from the perspective of the data consumer (e.g., device 202 in this example). This characteristic may indicate different situations depending, for example, on the particular transport currently in use. In a scenario where a low speed transport is employed, the limited speed of the transport may be creating a bottleneck in conveying the data. In such a situation it may be beneficial to employ a faster transport having better data-handling capacity. However, if a high speed and/or capacity transport is already in use when a determination is made that receiving-side buffers are near empty, then the problem may be that the volume of data being sent is too low to create a steady stream of incoming data over the transport. In this case, a lower power and/or capacity transport may be selected to convey the data while also conserving power.

A decision to perform the switch may be implemented based on many factors, and also in view of the particular configuration of the present invention that is being utilized. For example, a number of empty (or full) buffers and/or per time period, estimated needed bit-rate (e.g., determined based on monitoring the buffer filling level), etc. In addition, the request to perform the switch from one transport to another may be triggered by either end (TX or RX). In the case of push type configuration (e.g., stream from device 200 is pushed into storage in device 202) the TX side may be more likely to initiate a switch. In pull systems, (e.g. data is being pulled from device 200 to device 202), the RX side may initiate a switch. In either case, the implementation of one or more transports may result in a balancing of buffer levels as shown at 706, 708, 712 and 714 in FIG. 8, and as a result, an optimization of device resources.

Another exemplary use may include that during utilization of transport 800 communication is suddenly lost and hence some "fallback" procedure is needed. This procedure may be negotiated during the setup phase of link 800. In this procedure it may be established that link 750 may be used (e.g., in accordance with certain factors) if the link 800 is lost. However, it might be that transport protocols do not control packet retransmission, for example, in a case where a transport delivered an erroneous packet. In at least one instance a bearer may be carrying a data packet successfully from device to another but there is an error in the packet that is not noticed by the bearer error-checking mechanism. For the same reason a packet already in queue for transport 800 is lost if the link is lost, even though the data is still in TX buffer 704. In this situation, it would be beneficial for the data to be restored from buffer 704 and resent using transport 750.

From a power consumption standpoint, it may be beneficial to utilize high bit rate connectivity to move large amount of bits during a short period of time. This means that TX buffer 704 is intentionally filled up and then emptied with high bit rate communication link (depending, for example, on whether the provider application can support the increased speed). However, it is conceivable that transport 800 may, in at least one instance, not support a sleep mode that increases operational efficiency, which may mean that substantial power will be consumed during waiting time until TX buffer 704 is filled up again. In this kind of exemplary situation, a low rate radio sleep mode may be utilized, which would mean that the transport 750 is active during the time when TX buffer 704 is filling. This activity may be controlled, as previously set forth, by various hardware and/or software control elements in device 200.

Transport control may also be implemented in view of receiving side flow control factors. A transport-specific RX buffer corresponding to TX buffer 704 may become filled resulting in receiver-side data flow control issues. In such a situation the TX side may stop its transmission. If the link was high bit rate link (e.g., transport 800) it might be beneficial to negotiate that the slower transport 750 should become active until a "GO" signal is again issued. It is also possible for connectivity control elements to monitor radio operation. Either side (TX or RX) may trigger a low power transport mode, but now the TX side control may understand that there is no point trying to use high bit rate link despite its TX buffer filled condition because the RX side issued flow control, and thus cannot process incoming data as fast as the TX side.

V. Proactive Control

Figure 9:
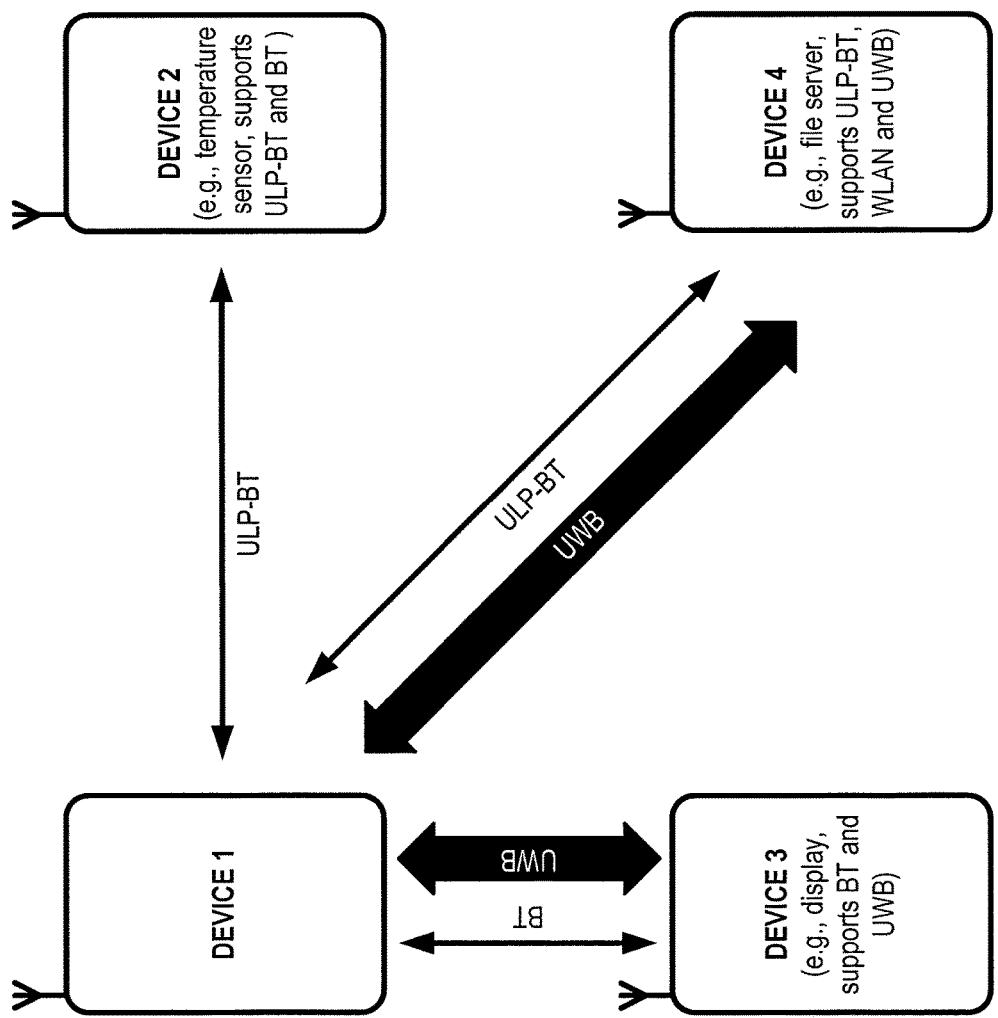
FIG. 9 discloses an example of multi-transport communication in accordance with at least one embodiment of the present invention.

In addition to the reactive control methodology described above, proactive control may also be implemented in accordance with at least one embodiment of the present invention. FIG. 9 discloses devices 1-4. In this example device 1 may be a controlling device, such as a personal communicator, a personal digital assistant (PDA), a wireless tablet device, etc. that is enabled to support a variety of wireless transports. Device 2 may be a low power temperature sensor that is enabled to communicate using Bluetooth™ (BT) and Ultra Low Power Bluetooth™ (ULP-BT). Device 3 may be a display (e.g., an LCD display) capable of communicating via BT and Ultra Wide Band (UWB). Device 4 may be a file server (e.g., a video server) capable of communicating via ULP-BT, WLAN and UWB.

Initially, a connection may be established between device 1 and the other devices utilizing a low power medium. This is shown in FIG. 9 by the use of the ULP-BT and BT links. This initial link may be established, for example, to obtain information about the other devices (e.g., supported mediums, available applications, etc.) Otherwise, device 1 may already be aware of the capabilities of the other devices (e.g., from previous connections). In the case of device 2, only a small amount of data is being exchanged. Therefore, device 1 and device 2 may continue to utilize ULP-BT in order to conserve power. On the other hand, the possible connectivity techniques between device 1 and device 4 include ULP-BT, WLAN and UWB. ULP-BT is a low power/speed, transport that would be too slow for video streaming, so the best transport would be either WLAN or UWB. UWB can provide data rate that is much faster than is needed for the video streaming, and thus, UWB would spend a great deal of time in the idle mode (e.g., no transmission or reception) during the video streaming. UWB power consumption during the inactivity periods is much higher compared to ULP-BT, resulting is a waste of power. An optimal solution would then be to use UWB only for transmission and reception of streaming video, and to use ULP-BT to manipulate UWB activity states and related wake-up cycle control.

There are at least two possible control implementations usable in accordance with various embodiments of the present invention. A first exemplary implementation may negotiate the duty cycle already at the beginning of video streaming. The role of ULP-BT would then be to set up the video streaming link as shown in FIG. 9, and to provide a timing reference (e.g., to the UWB radio so that it can awaken at correct moment). This kind of scenario may be used in the situations where the timing between active and inactive states may be fixed. Operation according to this exemplary scenario may be challenging in some situations. For example, if the connectivity patterns are fixed at the beginning of the service, it may be difficult to change or modify the connectivity patterns if any of the parameters change during the connection. This is especially challenging in situations when the data rate of a service is bursty (e.g., sporadic including short bursts of data). One good example of such a scenario is video streaming (e.g. throughput may slow down causing the activity period to be increased in order to maintain smooth video streaming quality). Thus, for these types of situations it may be good to have another possible operational mode providing better timing control.

In accordance with a second exemplary implementation, as shown in FIG. 9, the system may operate by utilizing ULP-BT to asynchronously control the WLAN reactivation. In this example, a ULP-BT and WLAN are both active. The ULP-BT radio may be used during the WLAN inactive periods, and as soon as high bit rate is needed (e.g., application data is generated) ULP-BT may trigger the WLAN radio to awaken. Once active over the ULP BT radio link, WLAN radios may, for example, communicate on the physical channel utilizing a RTS/CTS (Request-to-Send/Clear-to-Send) mechanism. This type of strategy may be used to manage asynchronous TX/RX activity. Another example may include a scenario where a UWB is being used, but then the UWB radio enters hibernation mode. When signaled over the active low power ULP-BT link, the UWB radios may return to the active mode and can reserve enough air time according to information that may be provided from the other wirelessly coupled devices over the ULP-BT link. This information exchange may decrease the time required for UWB connection set-up and/or reestablishment. In a video streaming scenario, the operation may be as follows: a first video packet of the stream content is transported over the UWB link from the video server to device 1. Once packet is received, UWB radio may enter into an idle mode. The ULP-BT radio of the device receiving the video stream may then be used to launch the transport of the next video packet of the stream over UWB link when the receiving device notices that the previous video packet of the stream is approaching its end. This operation may enable the higher power usage UWB radios to remain in idle mode most of the time, and as a result, may further significantly enhance power conservation in wirelessly coupled devices.

For example, the controlling of WLAN or UWB radio over ULP-BT may be arranged as follows: When a ULP-BT connection is created, one logical link may be reserved as a connectivity control channel. This channel may carry information regarding connectivity between devices. In this channel, for example, connectivity map information may be exchanged. In addition, this channel may make it possible to provide timing information (e.g., transport awakening and synchronization reference point delivery between devices) for control purposes. This connectivity information may be exchanged using any available transport, and may be used with many different applications to provide better initial transport selection, faster service discovery, optimal transport medium selection, transport handover etc. Connectivity map 140 may also be beneficial when selecting active bearer from multiple available bearers during link setup, link maintenance and data delivery. For example, at some point in FIG. 9 a user of device 1 may want to watch a movie, and then finds the device 4 and the video streaming service using ULP-BT. The two devices may negotiate that UWB will be used to provide an air interface for the video streaming due to the bandwidth performance requirements. During data delivery, the UWB radio may be activated in device 1 to receive the data, but as described above, during an inactive period (e.g., when no data is being delivered) ULP-BT may be used in "doze" mode to keep the link alive. The UWB radio may then be reactivated when higher data rates are once again needed during data delivery. If device 1 was to move out of UWB radio range at some point, the video streaming service would become unusable unless device 1 is able to determine alternative high rate transport to use. In this example case, both the device 1 and device 4 support WLAN, which may be used instead of UWB. As a result, control elements in the devices may have negotiated a backup transport and continue with that if needed as before.

Another benefit of this procedure, especially in the exemplary scenario shown in FIG. 9, is that radio activity information may be used for optimally performing multiradio control in devices. Earlier multiradio control relied upon device internal parameters, while in various embodiments of the present invention activity information of another device may be shared. This information may include negotiation of the connectivity technologies used and the timing synchronization of those technologies, taking into account the overall connectivity situation of the devices. This may enable the most optimal overall service quality and power consumption for both devices.

VI. Exemplary Transport Switching

Figure 10A:
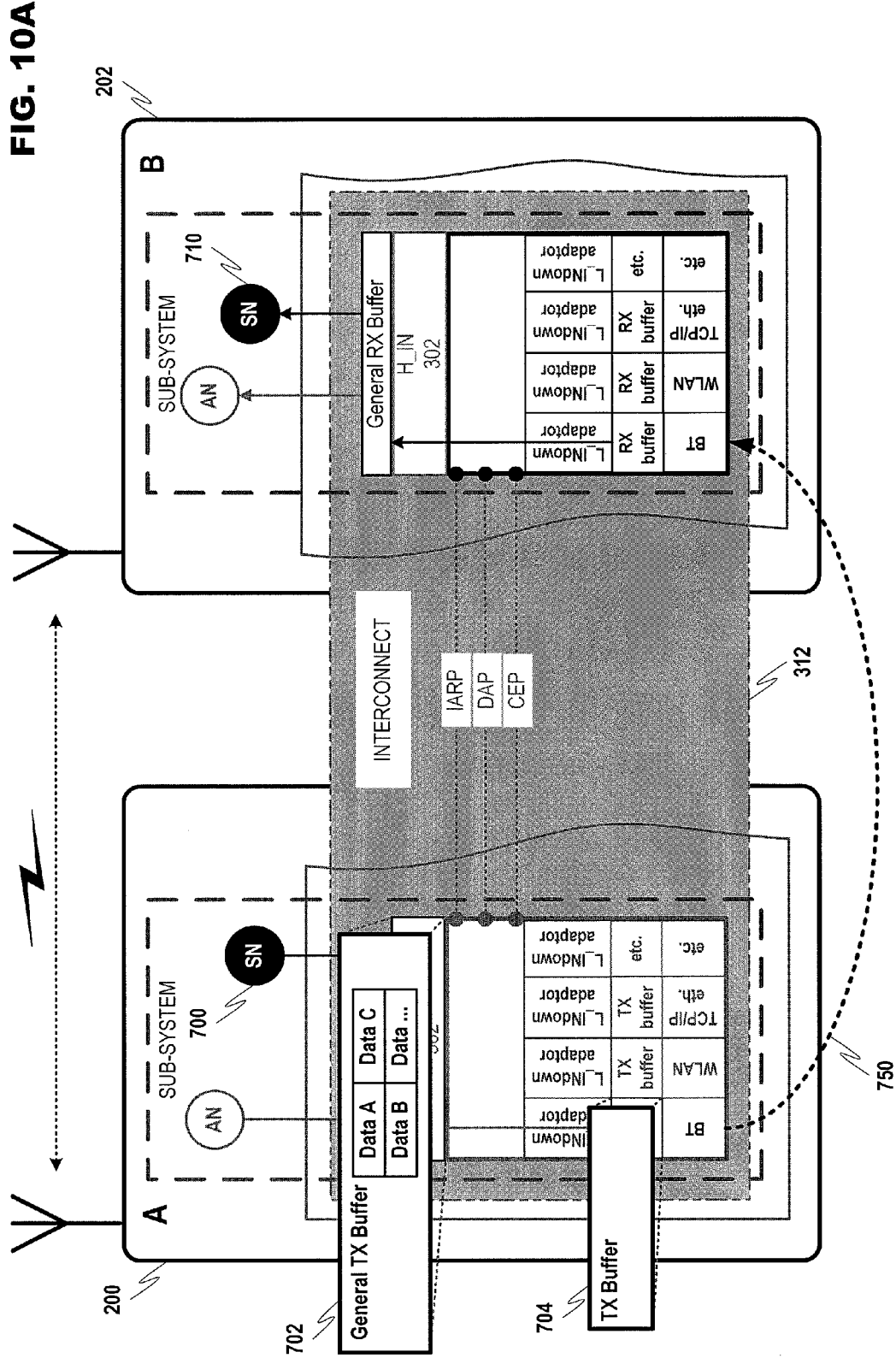
FIG. 10A discloses an exemplary communication scenario including multiple buffers containing data in accordance with at least one embodiment of the present invention.

FIG. 10A discloses an exemplary communication configuration in accordance with at least one exemplary embodiment of the present invention. Additional detail is given to general buffer 702, which may be transport-independent (e.g., operation is not influenced by the particular transport in use) and transport-specific buffer 704. As set forth above, while a one-way wireless transmission from device 200 to device 202 has been disclosed in FIG. 10A for the sake of explanation, the present invention is not limited to this specific example, and may be implemented to manage two-way communication via wired or wireless communication.

In the example of FIG. 10A, general buffer 702 may contain information for transmission. Exemplary data units A, B, C . . . are disclosed in FIG. 10A, wherein these units may be, for example, data packets for transmission to another node in a subsystem on another device (e.g., device 202). In FIG. 10A all of the information for transmission currently resides in general buffer 702. However, an exemplary data conveyance, and the effect that a transport failure or switching due to, for example a change in connection parameters, may have on this data conveyance will now be described with respect to FIG. 10B-10C.

Figure 10B:
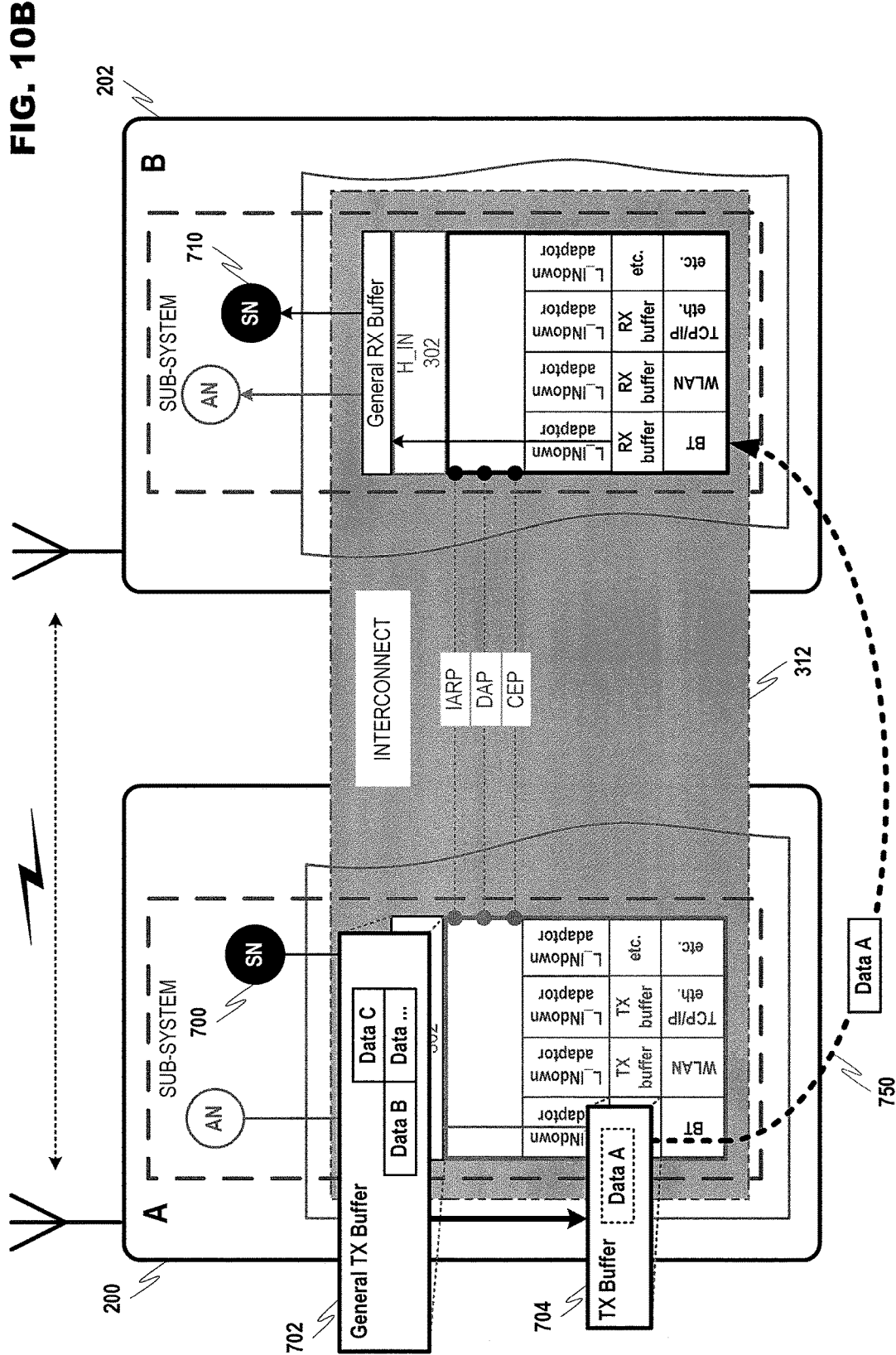
FIG. 10B discloses an example of information routing between buffers in accordance with at least one embodiment of the present invention.

FIG. 10B discloses an example of data being conveyed from an application and/or service level in device 200 to a node in the corresponding level in device 202. General buffer 702 has released data unit A to transport-specific buffer 704. Subsequently, transport-specific buffer 704 has released data unit A for conveyance over transport link 750 to device 202. Data A is also shown in a hold pending confirmation mode in transport-specific buffer 704. In other words, transport-specific buffer 704 will keep a copy of data A until a receipt confirmation is received (e.g., in the form of a return packet) from device 202. At this point the copy of data A may be deleted. However, if no receipt is received, then the selected transport may resend data A until, for example, a threshold condition is achieved. Examples of threshold conditions governing the resending of information may include a number of retries, a timeout period, etc.

Figure 10C:
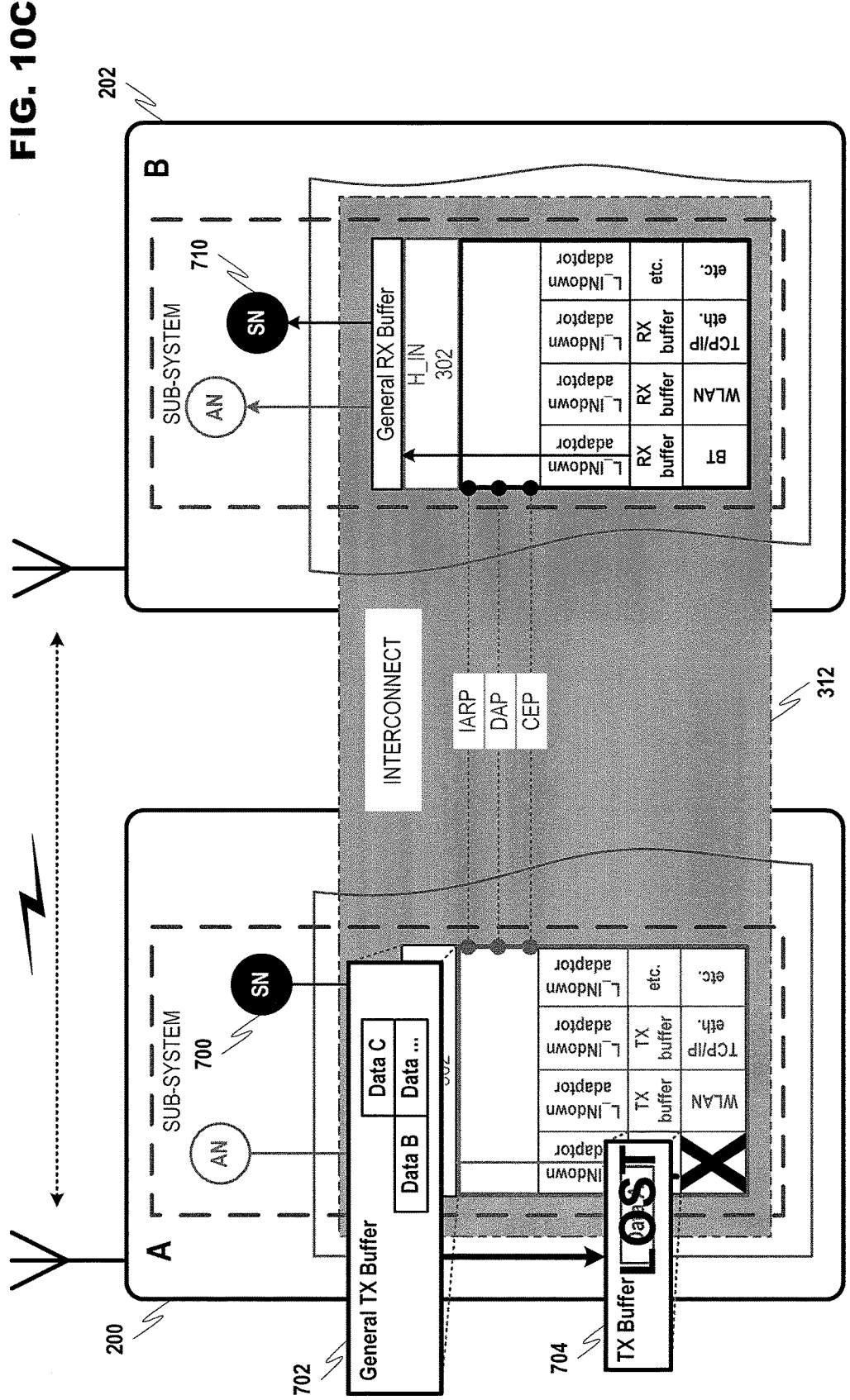
FIG. 10C discloses at least one impact of the loss of a selected transport on message routing in accordance with at least one embodiment of the present invention.

However, in some cases a connection established using a particular transport may become broken, or alternatively, parameters relating to the connection may become altered in a manner where another transport may become more preferable transport for maintaining the connection. For example, a wired transport may experience failure due to the physical disconnection of media (e.g., cables). Likewise, a wireless transport may experience a loss of connection due to a device leaving the transmission range of a particular transport, interference experienced from other radios in the same device or nearby wireless devices, electromagnetic emission, etc. Such an instance of disconnect is shown with respect to FIG. 10C. In FIG. 10C, the link 750 established over the selected transport has been lost. We may further assume that in this example the related hardware and/or software at the transport control level has attempted to reestablish the link with no success (e.g., the threshold condition governing retries has been met).

In the example of FIG. 10C, the loss of link 750 may abandon data A in transport-specific buffer 704. Since this data cannot be recovered to general buffer 702, the data may be deemed lost. To accommodate the loss of data A, device 200 may have to recreate data A. This may impact overall communications in that data B, C . . . may have to be delayed until data A is recreated and sent. All of the above activities related to recovering data A may in turn impact the overall QoS of communication being conducted in device 200, and therefore, the overall operation of any application and/or service that is relying on the transport for communication.

Figure 11A:
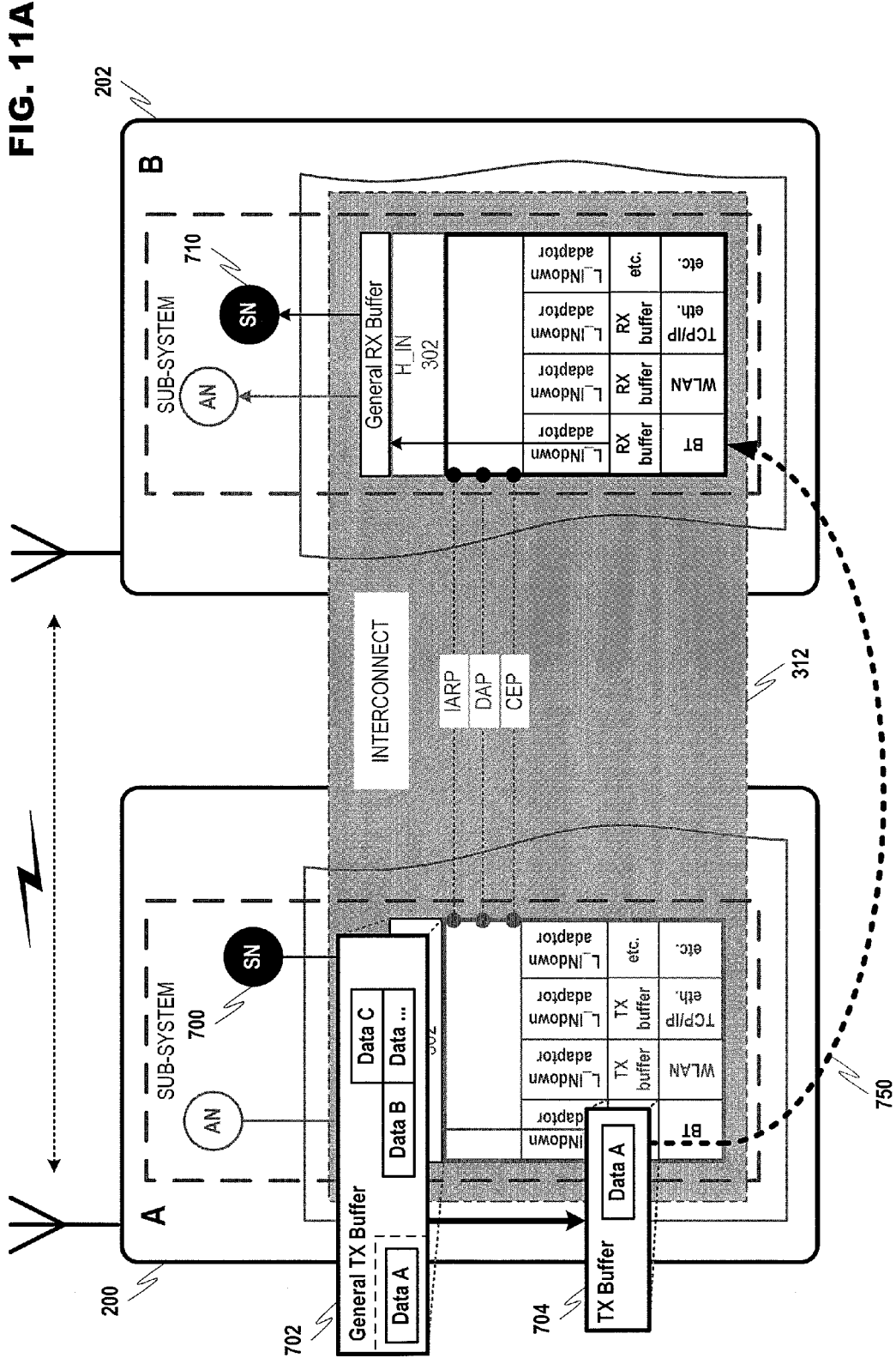
FIG. 11A discloses an example of information routing between buffers including transport failure protection in accordance with at least one embodiment of the present invention.

However, various exemplary embodiments of the present invention may provide a strategy for avoiding an overly detrimental impact on device operations caused by the loss of data by leveraging the flexibility of the NoTA architecture. Now referring to FIG. 11A, that may be structurally similar to FIG. 10A is disclosed. However, in FIG. 11A a copy of data A may be retained in general buffer 702 after the data A has been passed to transport-specific buffer 704.

The "copy" of data A may be retained until a confirmation has been received from device 202 that the information has been received. An example of this process is disclosed in FIG. 11B.

Figure 11B:
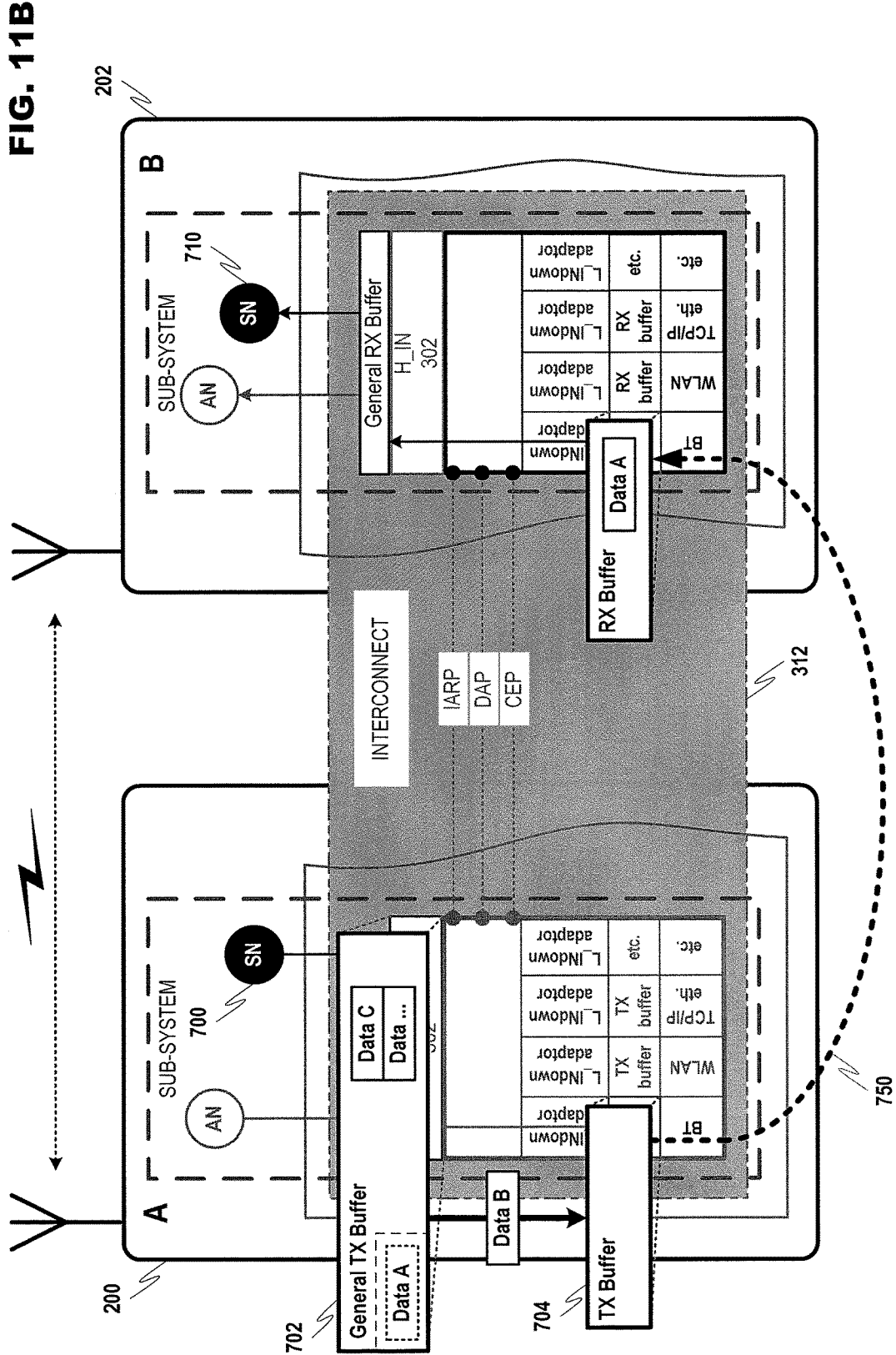
FIG. 11B discloses a further example the transport failure protection described with respect to FIG. 11A in accordance with at least one embodiment of the present invention.

FIG. 11B shows an example of a successful transaction. More specifically, information is being sent from transport-specific buffer 704 in device 200 to the corresponding transport-specific buffer 704 in device 202 over transport link 750. In this instance, data A has been received in device 202, which may be confirmed, for example, by a receipt confirmation packet being transmitted back from device 202 to device 200. As a result of the successful transaction, TX buffer may empty and accept the next data unit to be sent (e.g., data B). Either action listed above (e.g., the receipt of a confirmation packet or the acceptance of data B into transport-specific buffer 704) may be used as an indication to general buffer 702 that the transaction was successful. Alternatively, transport-specific buffer 704 may send a message to general buffer 702 indicating that the previous transaction was successful. General buffer 702 may then delete the copy of data A it was holding and may hold a copy of the next data unit sent.

Figure 11C:
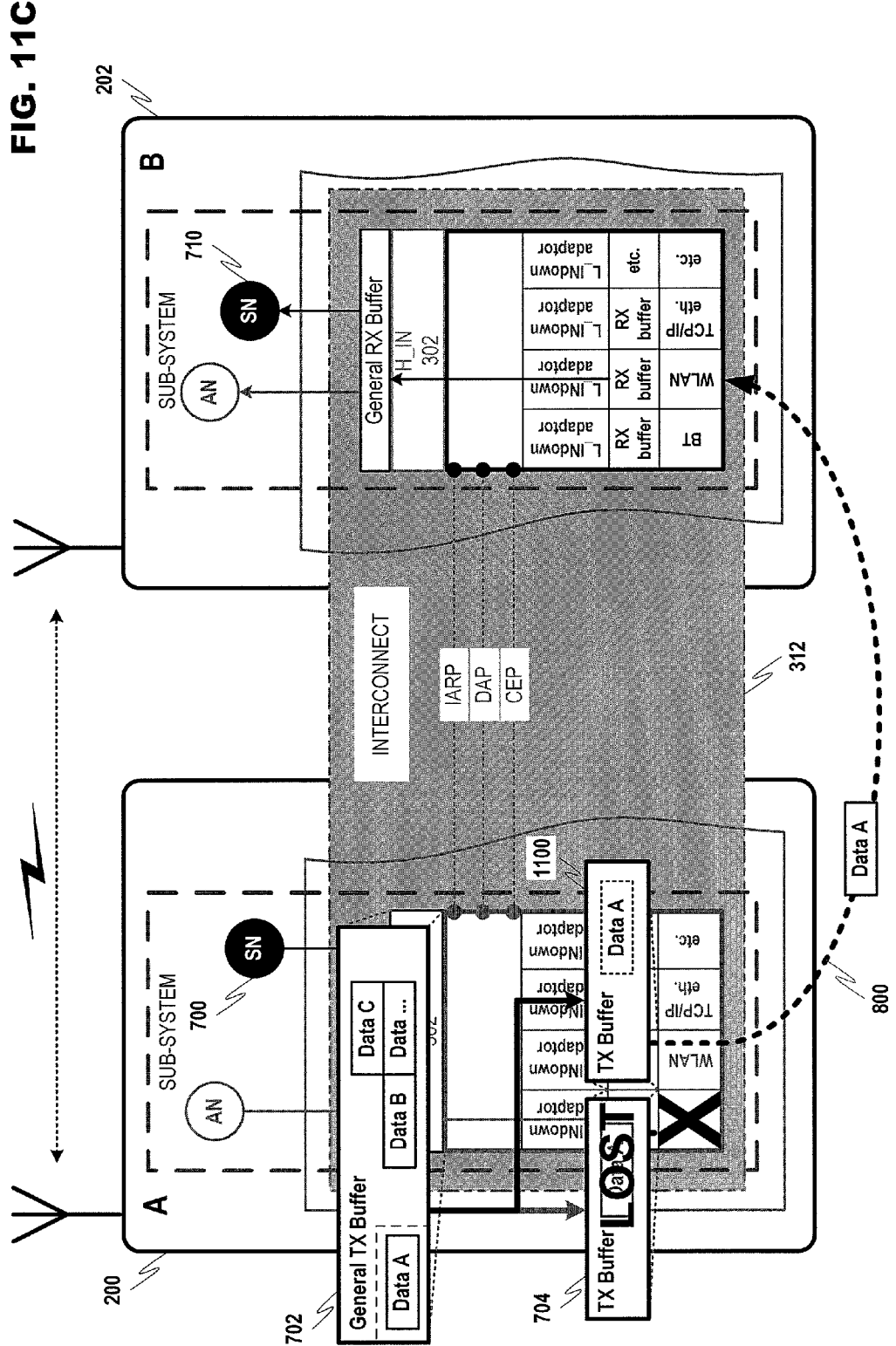
FIG. 11C discloses an example of transport failure protection activity during a transport failure in accordance with at least one embodiment of the present invention.

The effect of the above exemplary configuration, in accordance with at least one embodiment, on a situation where the previously selected transport experiences a failure, or alternatively, parameters relating to the connection have changed so that the previously selected transport is no longer preferable, and a transport switch is determined to happen, is shown with respect to FIG. 11C. Similar to FIG. 10C, the original link 750 over the previously selected transport has failed, leaving data A in transport-specific buffer 704 without any means to send or recover this data. However, since general buffer 702 has retained a copy of data A, corrective action may begin quickly. In this scenario a new link is established with another transport that has a corresponding transport-specific buffer 1100. General buffer 702 may then re-forward data A to transport-specific buffer 1100 over link 800.

It is important to note that general buffer 702 does not delete the information for data A until a successful transaction is confirmed over the new transport link 800. Therefore, once transport-specific buffer 1100 has received a confirmation and/or is ready to accept a new data unit, general buffer 702 may delete data A and forward a new data unit for transmission (e.g., data B). As in the process previously described above, general buffer 702 will save a copy of data B until a successful transaction is confirmed. Otherwise, a new transport may be selected if needed, and data B may be passed to the corresponding transport-specific buffer for sending.

In accordance with at least one embodiment of the present invention, the principle of releasing memory reserved in general buffer 702 for storing data copies may vary depending on the particular transport(s) in use. For example, since there may be various ways to indicate the receipt of some amount of data on the receiving end (e.g., transmission has been successful), then also the actual amount of received data confirmed may vary. More specifically, the granularity of general buffer 702 and transport-specific buffer 704 may differ, and thus, special consideration may be required when general buffer memory is released. In other words, the number of data copies that may be simultaneously maintained in general buffer 702 may depend on various transport-specific factors such as the speed of the transport(s) being used, whether the transport(s) supports error correction, the transmission data unit size of the transport(s), etc.

Figure 12:
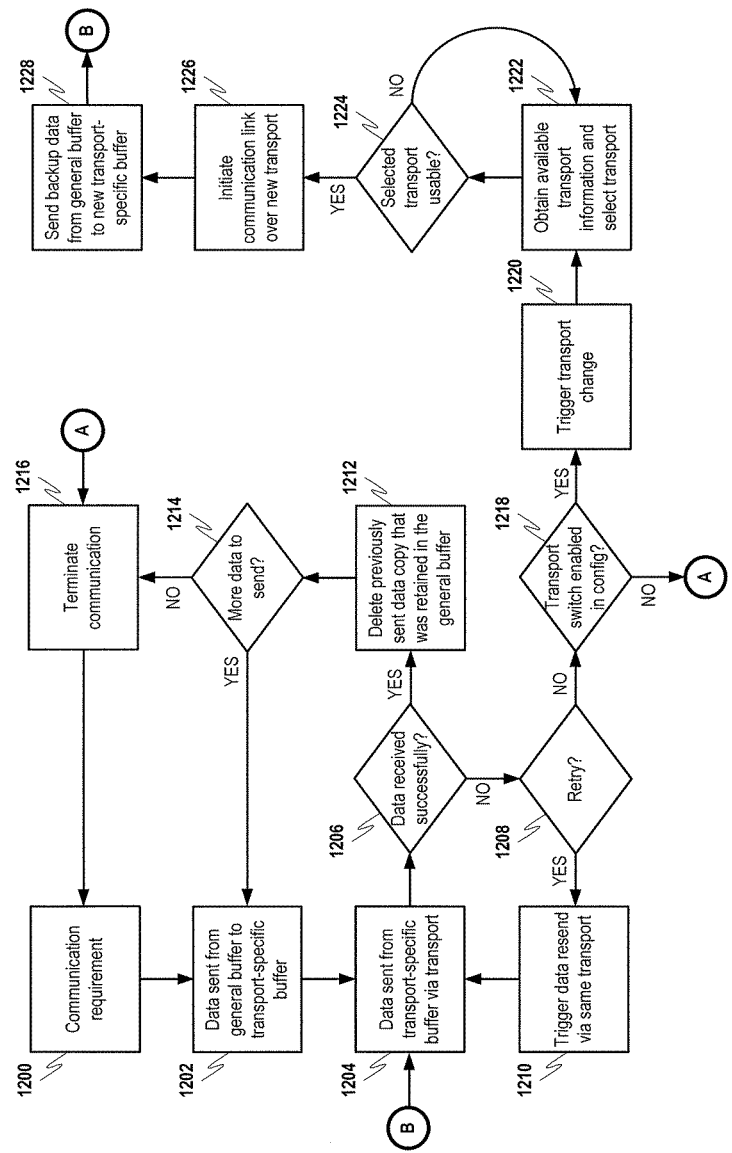
FIG. 12 discloses a flowchart of an exemplary information handling process in accordance with at least one embodiment of the present invention.

A flowchart describing a process flow in accordance with at least one exemplary embodiment of the present invention is now disclosed with respect to FIG. 12. In this example, applications and/or services in a device wants to interact with resources in other devices. In step 1200, a request for communication from the application and/or service level may be recognized. The data that is to be transmitted may then be stored in the general buffer, which may then be passed (possibly in smaller increments or units) to a transport-specific buffer in step 1202. The transport-specific buffer may then access the selected transport in order to send the information in step 1204, the transaction being conducted, for example, using a wired or wireless transport.

In step 1206 a determination is made as to whether the information sent in step 1204 was successfully received. This may be confirmed, for example, by a receipt confirmation message being received. If receipt is not confirmed, then in step 1208 a determination may be made as to whether the transport should try to resend the data. This determination may be made in view of a threshold condition such as described above. If the option to retry is available, the transport may trigger the information to be resent in step 1210. The information may be sent in step 1204, and the verification of successful data transmission occurs again in step 1206.

If the data reception at the destination device is confirmed, then the copy of the previously sent data may be deleted in step 1212. If more data remains to be sent as determined in step 1214, then the process may return to step 1202 where the next data unit may be passed from the general buffer to the transport-specific buffer, and in accordance with at least one exemplary embodiment of the present invention, a copy of the passed data may be stored in the general buffer. However, the occurrence of a transport failure may trigger an alternate flow.

For example, if the sent data was not received successfully as determined in step 1206, and retry is not available (e.g., because the transport is nonfunctional, because a threshold condition with respect to retries has been realized, etc.), then in step 1218 a determination may be made as to whether a transport switch (e.g., transport switch 310) has been enabled in the configuration of the system. This configuration may reside on one or more of the devices participating in the NoTA system, and may be set on any or all of the devices depending on the specific configuration and abilities (e.g., user interface capability) of the device. If the transport switch is not set in step 1218, then the process may terminate in step 1216 (shown as same-page reference "A" in FIG. 12) in preparation for the next communication requirement in step 1200. Alternatively, if the switch is enabled in step 1218, then a transport change may be triggered in step 1220. Information regarding available transports may be obtained in step 1222 and a transport may be selected. In at least one exemplary embodiment of the present invention, this information may be ordered, for example, based on the applicability of each available transport to the information to be communicated, the conditions of the environment (e.g., interference), the condition of the device (e.g., power level), etc. The selection of a transport may be verified in step 1224. For example, a situation may exist where the most suitable transport based on characteristics is not usable because it is already operating at a maximum usage level, because it might interfere with other active communications, etc. As a result, the process may return to step 1222 in order to possibly refresh the transport information and choose another transport.

Once a suitable transport is selected and is also determined to be available for use, then in step 1226 a communication link may be established using the new transport. The general buffer may then pass the saved copy of the unsuccessfully sent data to the transport-specific buffer corresponding to the newly selected transport in step 1228. The process flow may then return to step 1204 (shown as same-page reference "B" in FIG. 12) where the data may then be sent from the transport-specific buffer to its destination (e.g., other device) via the new transport, and a determination may again be made in step 1206 as to whether the retransmitted data, now being sent using an alternative transport, was successfully received at the destination device.

In view of the various embodiments of the present invention disclosed herein, several advantages may be realized from the combined implementation of transport-independent and transport-specific data buffers. For instance, expedient connection reestablishment and data retransmission may be realized in scenarios where one or more active transports may fail or a determination to switch an active transport for the connection has been made. In at least one exemplary scenario, data that may be awaiting transmission via Bluetooth when the transport experiences problems may be lost. However, a copy of the unsent data abandoned in the Bluetooth data buffer may still reside in the general data buffer. This backup data copy may be immediately allocated to an alternative transport (e.g., WLAN) without the burden of trying to recover and convert the Bluetooth-formatted data packets back into a transport-independent format because the "raw" data is still available in the transport-independent general data buffer in a transport-independent format. Further, the data stored in the general data buffer may be fragmented into transport-suitable packets, so that whenever the general data buffer receives an indication that the corresponding data has been successfully reached its destination, the copy stored in the general data buffer may then be removed. In the above exemplary scenario where the Bluetooth transport wasn't able to successfully transmit the data, an indication that the data has been reallocated to another transport may be provided to the Bluetooth radio control entity so that the data that was successfully sent via the alternative transport may be removed from the Bluetooth buffer.

Accordingly, it will be apparent to persons skilled in the relevant art that various changes in forma and detail can be made therein without departing from the spirit and scope of the invention. The breadth and scope of the present invention should not be limited by any of the above-described exemplary embodiments, but should be defined only in accordance with the following claims and their equivalents.

What is claimed:

1. A method, comprising:
    passing information from a transport-independent data buffer to a first transport-specific data buffer, wherein a copy of the passed information is maintained in the transport-independent data buffer in a transport-independent format;
    transmitting the information from the first transport-specific data buffer to an intended recipient via a transport corresponding to the first transport-specific data buffer;
    verifying the information transmitted via the transport was successfully received by the intended recipient based on a receipt confirmation received via the transport;
    if the information transmitted was successfully received, deleting the copy of the passed information maintained in the transport-independent data buffer; and
    if the information transmitted was not successfully received, selecting a new transport and forwarding a copy of the passed information maintained in the transport-independent data buffer to a second transport-specific data buffer corresponding to the new transport.

2. The method of claim 1, wherein the transport-independent data buffer and the first transport-specific data buffer to which the information is passed from the transport-independent data buffer reside in same device.

3. The method of claim 2, wherein the information is passed from the transport-independent data buffer to the first transport-specific data buffer in response to a request for communication from an application or service on the device.

4. The method of claim 1, wherein the receipt confirmation comprises a confirmation packet received from another device.

5. The method of claim 1, further comprising, if the information transmitted was not successfully received by the intended recipient, retransmitting the information from the first transport-specific data buffer corresponding to the transport to the intended recipient until a threshold condition is met and, if the threshold condition has been met and the retransmitted information was not successfully received by the intended recipient, performing said selecting a new transport and said forwarding a copy of the passed information maintained in the transport-independent data buffer to the second transport-specific data buffer corresponding to the new transport.

6. A computer program product comprising a non-transitory computer usable medium having computer readable program code recorded in said medium, comprising:
    code configured to cause passing of information from a transport-independent data buffer to a first transport-specific data buffer, wherein a copy of the passed information is maintained in the transport-independent data buffer in a transport-independent format;
    code configured to cause transmitting of the information from the first transport-specific data buffer to an intended recipient via a transport corresponding to the first transport-specific data buffer;
    code configured to cause verifying of the information transmitted via the transport was successfully received by the intended recipient based on a receipt confirmation received via the transport;
    code configured to cause, if the information transmitted was successfully received, deleting of the copy of the passed information maintained in the transport-independent data buffer; and
    code configured to cause, if the information transmitted was not successfully received, selecting a new transport and forwarding a copy of the passed information maintained in the transport-independent data buffer to a second transport-specific data buffer corresponding to the new transport.

7. The computer program product of claim 6, wherein the transport-independent data buffer and the first transport-specific data buffer to which the information is passed from the transport-independent data buffer reside in same device.

8. The computer program product of claim 7, wherein the code configured to cause passing of information from the transport-independent data buffer to the first transport-specific data buffer is triggered in response to a request for communication from an application or service on the device.

9. The computer program product of claim 6, wherein the receipt confirmation comprises a confirmation packet received from another device.

10. The computer program product of claim 6, further comprising code configured to cause, if the information transmitted was not successfully received by the intended recipient, retransmitting of the information from the first transport-specific data buffer corresponding to the transport to the intended recipient until a threshold condition is met and, if the threshold condition has been met and the retransmitted information was not successfully received by the intended recipient, performing said selecting a new transport and said forwarding a copy of the passed information maintained in the transport-independent data buffer to the second transport-specific data buffer corresponding to the new transport.

11. An apparatus, comprising:
    at least one communication module configured to support one or more wireless transports; and a processor coupled to the at least one communication module, the processor being configured to cause the apparatus to perform at least the following:
        pass information from a transport-independent data buffer to a first transport-specific data buffer, wherein a copy of the passed information is maintained in the transport-independent data buffer in a transport-independent format;
        transmit the information from the first transport-specific data buffer to an intended recipient via a transport corresponding to the first transport-specific data buffer;
        verify the information transmitted via the transport was successfully received by the intended recipient based on a receipt confirmation received via the transport;
        if the information transmitted was successfully received, delete the copy of the passed information maintained in the transport-independent data buffer; and
        if the information transmitted was not successfully received, select a new transport and forward a copy of the passed information maintained in the transport-independent data buffer to a second transport-specific data buffer corresponding to the new transport.

12. The apparatus of claim 11, wherein the transport-independent data buffer and the first transport-specific data buffer to which the information is passed from the transport-independent data buffer reside in the same apparatus.

13. The apparatus of claim 11, wherein the processor is further configured to cause the apparatus to pass information from the transport-independent data buffer to the first transport-specific data buffer in response to a request for communication from an application or service on the apparatus.

14. The apparatus of claim 11, wherein the receipt confirmation comprises a confirmation packet received from another apparatus.

15. The apparatus of claim 11, wherein the processor is further configured to cause the apparatus to, if the information transmitted was not successfully received by the intended recipient, retransmit information from the first transport-specific data buffer corresponding to the transport to the intended recipient until a threshold condition is met and, if the threshold condition has been met and the retransmitted information was not successfully received by the intended recipient, perform said selecting a new transport and said forwarding a copy of the passed information maintained in the transport-independent data buffer to the second transport-specific data buffer corresponding to the new transport.

* * * * *